(12) United States Patent
Folkman et al.

(10) Patent No.: US 11,960,548 B2
(45) Date of Patent: Apr. 16, 2024

(54) SYSTEM AND METHOD FOR GENEALOGICAL ENTITY RESOLUTION

(71) Applicant: Ancestry.com Operations Inc., Lehi, UT (US)

(72) Inventors: Tyler Folkman, Lehi, UT (US); Rey Furner, Lehi, UT (US); Drew Pearson, Lehi, UT (US)

(73) Assignee: Ancestry.com Operations Inc., Lehi, UT (US)

( * ) Notice: Subject to any disclaimer, the term of this patent is extended or adjusted under 35 U.S.C. 154(b) by 402 days.

(21) Appl. No.: 17/261,458

(22) PCT Filed: Jul. 22, 2019

(86) PCT No.: PCT/US2019/042807
§ 371 (c)(1),
(2) Date: Jan. 19, 2021

(87) PCT Pub. No.: WO2020/018991
PCT Pub. Date: Jan. 23, 2020

(65) Prior Publication Data
US 2021/0319003 A1  Oct. 14, 2021

Related U.S. Application Data

(60) Provisional application No. 62/701,322, filed on Jul. 20, 2018.

(51) Int. Cl.
*G06F 16/00* (2019.01)
*G06F 16/215* (2019.01)
(Continued)

(52) U.S. Cl.
CPC .......... *G06F 16/906* (2019.01); *G06F 16/215* (2019.01); *G06F 16/2246* (2019.01);
(Continued)

(58) Field of Classification Search
None
See application file for complete search history.

(56) References Cited

U.S. PATENT DOCUMENTS 9,116,882 B1 * 8/2015 Macpherson .......... G16B 45/00
2005/0147947 A1 * 7/2005 Cookson ................ G06F 16/20
434/154

(Continued)

OTHER PUBLICATIONS

European Search Report for EP 19837768.1 dated Mar. 1, 2022, all pages.
(Continued)

*Primary Examiner* — Bai D Vu
(74) *Attorney, Agent, or Firm* — Keller Preece PLLC

(57) ABSTRACT

Systems, methods, and other techniques for genealogical entity resolution. The systems obtain first tree data and second tree data, the first tree data corresponding to a first tree person and the second tree data corresponding to a second tree person. The systems extract a set of features from the first tree data and the second tree data. The systems further generate an individual-level similarity score for each possible pairing of tree persons based on the set of features to identify a set of most-similar tree persons based on the individual-level similarity score for each possible pairing. The systems also provide a plurality of individual-level similarity scores for the set of most-similar tree persons as input to a family-level ML model to determine that the first tree person and the second tree person correspond to a same individual.

20 Claims, 16 Drawing Sheets

(51) Int. Cl.
*G06F 16/22* (2019.01)
*G06F 16/25* (2019.01)
*G06F 16/28* (2019.01)
*G06F 16/906* (2019.01)
*G06F 18/22* (2023.01)
*G06N 3/045* (2023.01)
*G06N 20/20* (2019.01)

(52) U.S. Cl.
CPC .......... *G06F 16/258* (2019.01); *G06F 16/287* (2019.01); *G06F 18/22* (2023.01); *G06N 3/045* (2023.01); *G06N 20/20* (2019.01)

(56) References Cited

U.S. PATENT DOCUMENTS

| | | | |
|---|---|---|---|
| 2007/0266003 A1* | 11/2007 | Wong | G06Q 90/00 |
| 2008/0033933 A1 | 2/2008 | Cookson, Jr. et al. | |
| 2011/0029521 A1* | 2/2011 | Thayne | G06F 16/90 |
| | | | 707/E17.03 |
| 2012/0054190 A1 | 3/2012 | Peters | |
| 2012/0218289 A1 | 8/2012 | Rasmussen et al. | |
| 2014/0082568 A1 | 3/2014 | Hulet et al. | |
| 2014/0278138 A1* | 9/2014 | Barber | G06F 16/24575 |
| | | | 702/19 |
| 2016/0048517 A1* | 2/2016 | Jensen | G06F 16/245 |
| | | | 707/758 |
| 2017/0213127 A1 | 7/2017 | Duncan | |
| 2017/0293861 A1 | 10/2017 | Roy et al. | |
| 2018/0189379 A1* | 7/2018 | Phillips | G06F 16/285 |

OTHER PUBLICATIONS

International Search Report and Written Opinion dated Oct. 2, 2019 in related application No. PCT/US2019/042807, all pgs.
Chen, et al. "Data Mining: An Overview from a Database Perspective." In: IEEE Transactions on 1-20 Knowledge and data Engineering. Dec. 1996 (Dec. 1996) Retrieved on Sep. 19, 2019 (Sep. 19, 2019}.

\* cited by examiner

SYSTEM AND METHOD FOR GENEALOGICAL ENTITY RESOLUTION

CROSS-REFERENCES TO RELATED APPLICATIONS

This application claims priority to U.S. Provisional Patent Application No. 62/701,322, filed Jul. 20, 2018, entitled "GENERES: A GENEALOGICAL ENTITY RESOLUTION SYSTEM," the entire content of which is herein incorporated in its entirety.

BACKGROUND OF THE INVENTION

In certain genealogical or family history databases, ancestor data is stored in trees and records which contain one or more persons or individuals. Genealogical data has various types. Genealogical data includes historical and genealogical records such as vital, census, voter, military, immigration, and church records. Genealogical data also includes user generated information. With all genealogical records and user generated data alternate spellings, typos, missing data, and bad data are common. Genealogical data may also include intra-tree or record relationships which indicate the relationships between the various individuals within the database. In many cases, persons in one data collection may correspond to persons in another data collection, as many genealogical records and user data have references to multiple individuals within the same collection. Also, user generated data may contain references to relatives within the same user tree.

One challenge in maintaining genealogical databases has been entity resolution, which refers to the problem of identifying and linking different manifestations of the same real world object. For example, many manifestations of the same person may appear across multiple trees. This problem arises due to discrepancies between different historical records, discrepancies between historical records and human accounts, and discrepancies between different human accounts. For example, different users having a common ancestor may have different opinions as to the name, date of birth, and place of birth of that ancestor. The problem becomes particularly prevalent when large amounts of historical documents are difficult to read, causing a wide range of possible ancestor data. Accordingly, there is a need for improved techniques in the area.

BRIEF SUMMARY OF THE INVENTION

Examples given below provide a summary of the present invention. As used below, any reference to a series of examples is to be understood as a reference to each of those examples disjunctively (e.g., "Examples 1-4" is to be understood as "Examples 1, 2, 3, or 4").

Example 1 is a computer-implemented method comprising: obtaining first tree data and second tree data, wherein the first tree data corresponds to a first tree person from a first genealogical tree and the second tree data corresponds to a second tree person from a second genealogical tree, and wherein each of the first genealogical tree and the second genealogical tree comprise a plurality of interconnected tree persons corresponding to individuals that are related to each other; extracting a set of features from the first tree data and the second tree data; generating, using an individual-level machine learning (ML) model, an individual-level similarity score for each possible pairing of tree persons from the first genealogical tree and the second genealogical tree based on the set of features; identifying, based on the individual-level similarity score for each possible pairing of tree persons, a set of most-similar tree persons from the first genealogical tree and the second genealogical tree; providing a plurality of individual-level similarity vectors for the set of most-similar tree persons as input to a family-level ML model; and determining, using the family-level ML model, that the first tree person and the second tree person correspond to a same individual based on the plurality of individual-level similarity vectors for the set of most-similar tree persons.

Example 2 is the computer-implemented method of example(s) 1, wherein at least one of the individual-level ML model or the family-level ML model is a neural network.

Example 3 is the computer-implemented method of example(s) 1, further comprising: prior to generating the individual-level similarity score for each possible pairing of tree persons, training the individual-level ML model using training data and user-prepared labels.

Example 4 is the computer-implemented method of example(s) 1, further comprising: generating, based on the set of features, an individual-level similarity vector for each possible pairing of tree persons.

Example 5 is the computer-implemented method of example(s) 4, wherein the individual-level similarity score for each possible pairing of tree persons is generated based on the individual-level similarity vector for each possible pairing of tree persons.

Example 6 is the computer-implemented method of example(s) 5, wherein providing the plurality of individual-level similarity vectors includes: selecting the plurality of individual-level similarity vectors for the set of most-similar tree persons from the individual-level similarity vector for each possible pairing of tree persons; or generating the plurality of individual-level similarity vectors for the set of most-similar tree persons.

Example 7 is the computer-implemented method of example(s) 5, wherein the family-level ML model includes a first stage and a second stage, wherein the first stage determines whether the first tree person and the second tree person do not correspond to the same individual, and wherein the second stage determines whether the first tree person and the second tree person correspond to the same individual.

Example 8 is a non-transitory computer-readable medium comprising instructions that, when executed by one or more processors, cause the one or more processors to perform operations comprising: obtaining first tree data and second tree data, wherein the first tree data corresponds to a first tree person from a first genealogical tree and the second tree data corresponds to a second tree person from a second genealogical tree, and wherein each of the first genealogical tree and the second genealogical tree comprise a plurality of interconnected tree persons corresponding to individuals that are related to each other; extracting a set of features from the first tree data and the second tree data; generating, using an individual-level machine learning (ML) model, an individual-level similarity score for each possible pairing of tree persons from the first genealogical tree and the second genealogical tree based on the set of features; identifying, based on the individual-level similarity score for each possible pairing of tree persons, a set of most-similar tree persons from the first genealogical tree and the second genealogical tree; providing a plurality of individual-level similarity vectors for the set of most-similar tree persons as input to a family-level ML model; and determining, using the family-level ML model, that the first tree person and the second tree person correspond to a same individual based on the plurality of individual-level similarity vectors for the set of most-similar tree persons.

Example 9 is the non-transitory computer-readable medium of example(s) 8, wherein at least one of the individual-level ML model or the family-level ML model is a neural network.

Example 10 is the non-transitory computer-readable medium of example(s) 8, wherein the operations further comprise: prior to generating the individual-level similarity score for each possible pairing of tree persons, training the individual-level ML model using training data and user-prepared labels.

Example 11 is the non-transitory computer-readable medium of example(s) 8, wherein the operations further comprise: generating, based on the set of features, an individual-level similarity vector for each possible pairing of tree persons.

Example 12 is the non-transitory computer-readable medium of example(s) 11, wherein the individual-level similarity score for each possible pairing of tree persons is generated based on the individual-level similarity vector for each possible pairing of tree persons.

Example 13 is the non-transitory computer-readable medium of example(s) 12, wherein providing the plurality of individual-level similarity vectors includes: selecting the plurality of individual-level similarity vectors for the set of most-similar tree persons from the individual-level similarity vector for each possible pairing of tree persons; or generating the plurality of individual-level similarity vectors for the set of most-similar tree persons.

Example 14 is the non-transitory computer-readable medium of example(s) 12, wherein the family-level ML model includes a first stage and a second stage, wherein the first stage determines whether the first tree person and the second tree person do not correspond to the same individual, and wherein the second stage determines whether the first tree person and the second tree person correspond to the same individual.

Example 15 is a system comprising: one or more processors; and a computer-readable medium comprising instructions that, when executed by the one or more processors, cause the one or more processors to perform operations comprising: obtaining first tree data and second tree data, wherein the first tree data corresponds to a first tree person from a first genealogical tree and the second tree data corresponds to a second tree person from a second genealogical tree, and wherein each of the first genealogical tree and the second genealogical tree comprise a plurality of interconnected tree persons corresponding to individuals that are related to each other; extracting a set of features from the first tree data and the second tree data; generating, using an individual-level machine learning (ML) model, an individual-level similarity score for each possible pairing of tree persons from the first genealogical tree and the second genealogical tree based on the set of features; identifying, based on the individual-level similarity score for each possible pairing of tree persons, a set of most-similar tree persons from the first genealogical tree and the second genealogical tree; providing a plurality of individual-level similarity vectors for the set of most-similar tree persons as input to a family-level ML model; and determining, using the family-level ML model, that the first tree person and the second tree person correspond to a same individual based on the plurality of individual-level similarity vectors for the set of most-similar tree persons.

Example 16 is the system of example(s) 15, wherein at least one of the individual-level ML model or the family-level ML model is a neural network.

Example 17 is the system of example(s) 15, wherein the operations further comprise: prior to generating the individual-level similarity score for each possible pairing of tree persons, training the individual-level ML model using training data and user-prepared labels.

Example 18 is the system of example(s) 15, wherein the operations further comprise: generating, based on the set of features, an individual-level similarity vector for each possible pairing of tree persons.

Example 19 is the system of example(s) 18, wherein the individual-level similarity score for each possible pairing of tree persons is generated based on the individual-level similarity vector for each possible pairing of tree persons.

Example 20 is the system of example(s) 19, wherein providing the plurality of individual-level similarity vectors includes: selecting the plurality of individual-level similarity vectors for the set of most-similar tree persons from the individual-level similarity vector for each possible pairing of tree persons; or generating the plurality of individual-level similarity vectors for the set of most-similar tree persons.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

Figure 1:
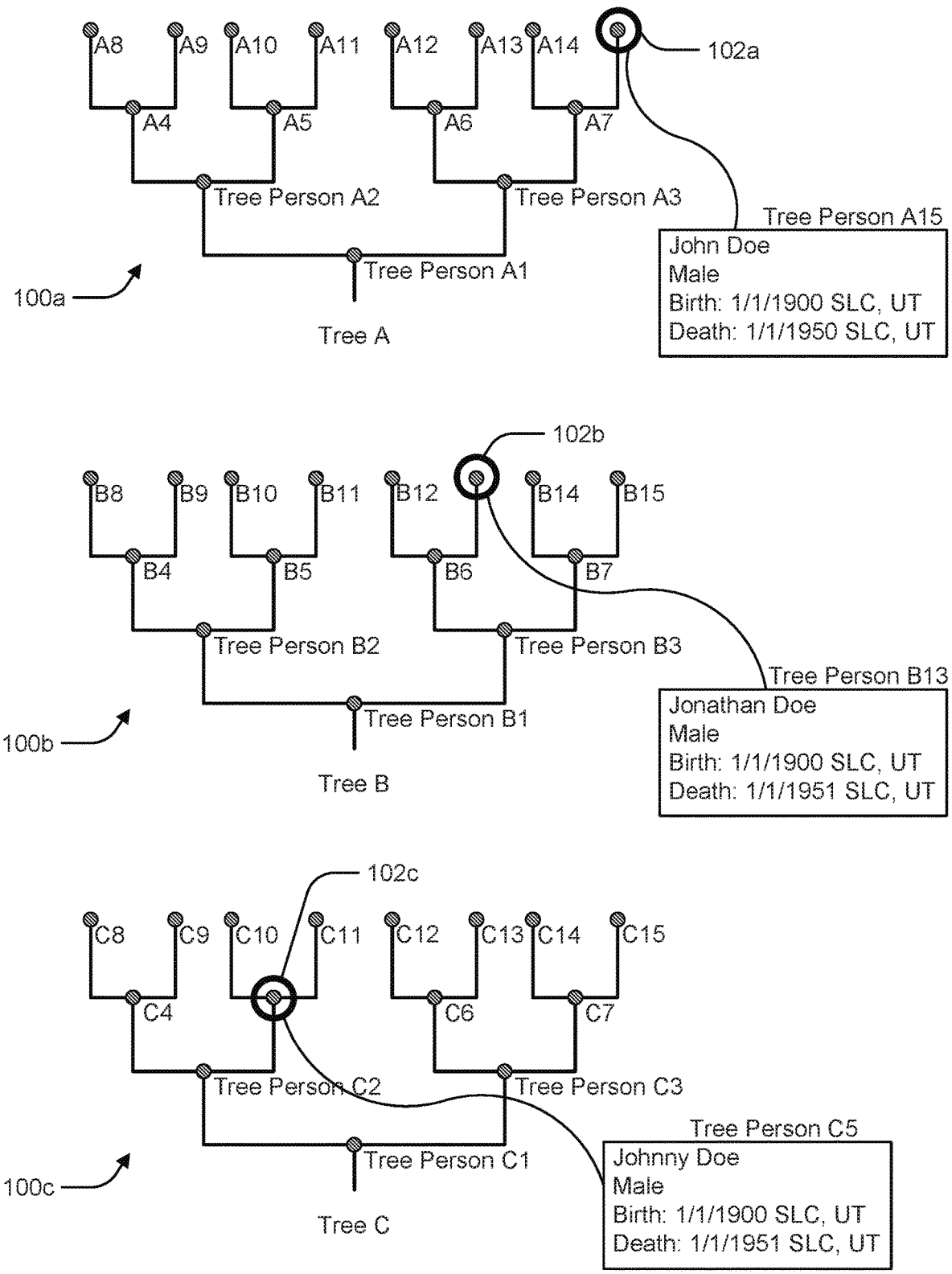
FIG. 1 illustrates various family trees, each comprising various individuals, according to some embodiments of the present invention.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION OF THE INVENTION

Entity resolution is a long studied problem that still poses some interesting challenges. The problem is defined as identifying and linking different manifestations of the same real world object. Many organizations collect data on entities with potential duplicate data. For certain genealogical databases, each group of user nodes or records may be considered in the format of a genealogical tree or records connected by biological and other family relationships which will be designated herein by the general term "tree data". Tree data nodes often have overlap with other tree data nodes which creates duplicate entities in a genealogical database. One way to track known duplicates is to resolve multiple entities into one cluster. This provides immense value to users by allowing them to receive more targeted hints, understand how they are related to people in records outside their personal tree, and have a more precise searching capabilities.

Genealogical data may be received from a source selected from the group consisting of the Ancestry World Tree system, a Social Security Death Index database, the World Family Tree system, a birth certificate database, a death certificate database, a marriage certificate database, an adoption database, a draft registration database, a veterans database, a military database, a property records database, a census database, a voter registration database, a phone database, an address database, a newspaper database, an immigration database, a family history records database, a local history records database, a business registration database, and a motor vehicle database. Additionally, genealogical data can be user-generated. Genealogical data may also include data from a clustered database derived from records and user data.

Some embodiments of the present invention relate to modifying a cluster database when it is determined that two persons in different trees data collections correspond to the same individual. In some instances, a node connection may be generated between two nodes corresponding to the two persons in different trees. This technique may be used incrementally during the generation of the cluster database. Thus, as a user creates a new node or edits an existing node, the disclosed technique may be used to check whether that node resolves to a current entity cluster or whether it should generate its own cluster.

Another advantage of identifying these duplicate persons is that one user or record collection may have information for their ancestor that another user does not. As more duplicate persons are identified, rather than list every duplicate person for the user to browse, it may be more helpful to show a user an aggregation of all the duplicates merged together in a single, concise view of the cluster (i.e., a grouping of duplicate persons). Another advantage of identifying duplicate persons is that if users A and B have a duplicate person in their family trees, then it can be determined that users A and B are related to each other at least via the duplicate person. Furthermore, once the duplicate person is identified, user A may supplement his/her family tree with information from user B's family tree, and vice-versa.

In order to resolve which records and tree nodes refer to which real world entities, some embodiments described herein reduce the problem to a pairwise classification problem where the classes are "Match", "Non-Match" or a "Plausible" match. There may be many criteria to consider when establishing what constitutes a match. Some embodiments described herein attempt to replicate the matching criteria of a genealogist by using a machine learning (ML) algorithm to combine all these criteria into a prediction score. Some embodiments described herein employ a hierarchical classification algorithm which leverages the familial structure of genealogical records. To learn such a model, an algorithm is trained on thousands of pairwise entity comparisons labeled by professional genealogists to determine whether two records or tree nodes refer to the same entity. This approach was determined to provide significant improvements over previous rule-based approaches used for entity recognition.

With billions of tree nodes and records, genealogy companies have a wealth of data on which to perform entity resolution. The data also comes with a few challenges. First, the tree nodes are user generated data. This means that typos, missing data, and bad data are possible. To handle some of these issues, genealogy companies have systems which normalize information like places and dates to a common format and appropriately clean and tokenize fields like names. Otherwise, the data is treated as entered by the user. Second, records span many decades as well as formats and are digitized from records of various qualities.

In some instances, in order to compare two entities, genealogists may have access to a limited amount of external source information about these persons or records provided by a tool. In some instances, active learning is used to better guide the labeling process of the genealogists. The main idea behind active learning is that a model can learn with fewer data if it can help choose the most effective data to be labeled. This assumes that not every piece of labeled data provides the same value to the model. For example, if a significant amount of census records had been labeled, but not very many death records, the model may learn more from an additional death record compare as opposed to a census record compare. Once a large enough sample of randomly selected labeled data with which to build a baseline model is obtained, the labeling efforts may be focused on compares for which the model was unsure or disagreed with predictions from previous rule-based models. Also, since deciding whether two entities match can be a subjective task, at least two professional genealogists may label each compare to help reduce the noise.

In some embodiments, extracted features include information on names, births, deaths, marriages, and other information from the compare. Thus, it can be determined how similar the relative information matches for each relative type. To limit the number of features, when a compare has more than three children, the three children that have the highest similarity score may be used. Similarly when a compare has more than one spouse, the one with the highest matching similarity score can be used. In addition to these features, family level features which encompass data from all members of the family can be extracted, such as how well do the locations and times of events match across both families.

Some embodiments of the present invention include a two-step learning process. First, a model is trained using only features from the person of interest, excluding family relations. Once trained, this model allows the strength of comparisons between family members to be evaluated. For example, given a comparison between two persons, this model can be used to determine how well their mothers match. This model can be referred to as the individual-level model. Once this model has extracted the most similar relations for mothers, fathers, spouses, and three children, features can be extracted from all these relations. This can result in almost 400 features, including the actual probabilities returned from the first model on the closeness of the family relations.

Next, a second model is trained using this extended feature set. This model can be referred to as the family-level model because it leverages information from the family relations of the entities. In some embodiments, the family-level model consists of two sub-models. The first sub-model is trained by treating matches and plausible matches as one class and non-matches as another class to first determine the probability that an entity compare is a match or plausible match. This first sub-model serves two purposes. First, it provides a similarity score between two entities. Second, this model learns how to separate clearly between non-matches and everything else without the burden of separating out plausible matches which can often look similar to matches. The second sub-model is trained only on the matches and the plausible matches. This sub-model focuses on separating out the clear matches from those which are more borderline. This distinction can be beneficial as it allows genealogy companies to provide different weights to plausible matches when providing recommendations to users.

As used herein, the terms "tree", "family tree", "genealogical tree", and "tree data" may be used interchangeably and may refer to data from user data and historical records in multiple databases involving the grouping of a finite number of related persons that are interconnected according to their relationships. Two persons that are directly connected in a tree or record data may be in a parent-child relationship, in a sibling relationship, or in some other relationship. Tree data may be displayed as various points connected by lines. The base or bottom of the tree may comprise a single individual, which may or may not be a user of the tree.

As used herein, the terms "tree person", "person", "individual", and "node" may be used interchangeably and may refer to a representation in a tree or historical record of a living or deceased real-life individual.

As used herein, the term "user" may refer to an owner or creator of a tree, or may refer to any entity, human or non-human, that is using a tree or genealogical database in some manner.

As used herein, the term "cluster" may refer to a grouping of tree persons, each from different trees and each determined to correspond to the same real-life individual. Although clusters are designed to group only tree persons that correspond to the same real-life individual, this is not always possible, and often clusters are either overinclusive or underinclusive based on the similarity threshold that is employed.

FIG. 1 illustrates trees 100a-c, each having similar individuals 102a-c, according to some embodiments of the present invention. Trees 100a-c are also denoted as Trees A, B, and C, respectively. Trees A, B, and C may be owned by, created by, and/or used by Tree Persons A1, B1, and C1, or by some other users unrelated to persons in Trees A, B, and C. In some embodiments, it may be determined that Tree Person A15 (named "John Doe"), Tree Person B13 (named "Jonathan Doe"), and Tree Person C5 (named "Johnny Doe") correspond to the same real-life individual based on their similarity. Although a user of Tree A may understand Tree Person A15 to be John Doe, it may be beneficial to that user to become aware of the information contained in Trees B and C, which contain John Doe as having a differently spelled name and a different date of death. Similarly, users of Trees B and C may benefit to know of alternate spellings and dates of death for Tree Persons B13 and C5, whom they understand to be Jonathan Doe and Johnny Doe. Therefore, to assist users of Trees A, B, and C in their genealogical research, it is often advantageous to identify, group, and possibly merge together tree persons that are determined to correspond to the same real-life individual.

One method for determining whether Tree Persons A15, B13, and C5 correspond to the same real-life individual is a rule-based algorithm in which a human expert looks at different pairs of persons and creates rules. For example, consider that two persons are named "Jack Smith" but one is born in Mar. 1, 1981 and the other is born in Mar. 1, 1932. A rule-based algorithm may generate four separate scores, one for a comparison of the names (a high score in this example), one for a comparison of the month of birth (a high score in this example), one for a comparison of the day of birth (a high score in this example), and one for the year of birth (a low score in this example). The four separate scores are added together to generate a final similarity score. The higher the similarity score, the higher the probability that the two tree persons correspond to the same real-life individual.

There are several disadvantages to rule-based algorithms. First, they are subjective. When scores are combined into a final similarity score, they may be weighted such that the final similarity score is overly sensitive to the chosen weighting, which may be arbitrary. Second, rule-based algorithms become extremely complicated as they must account for several special cases, such as popular names. Third, rule-based algorithms are difficult to update and maintain. Over time, there may be hundreds of rules to generate a single final similarity score. If new special cases arise, a human expert has to verify whether all the previously generated rules will apply to the new case or not. If a particular rule does not apply, then a change may be needed.

Figure 2:
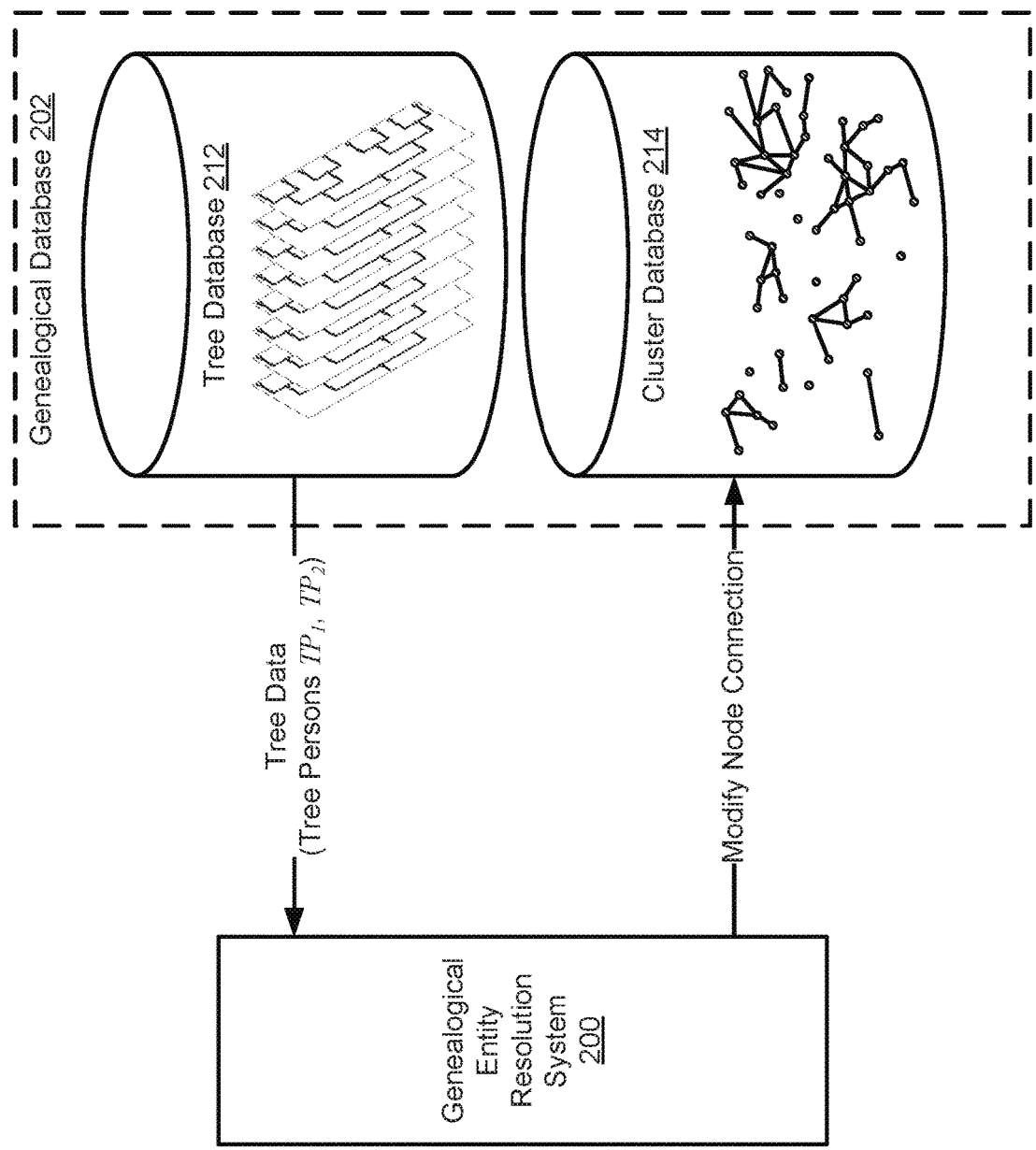
FIG. 2 illustrates a block diagram of a system for modifying a cluster database, according to some embodiments of the present invention.

FIG. 2 illustrates a block diagram of a genealogical entity resolution system 200 for modifying a genealogical database 202, according to some embodiments of the present invention. In some embodiments, genealogical database 202 includes a tree database 212 and a cluster database 214.

In some embodiments, genealogical entity resolution system 200 includes a tree person selector for selecting tree data corresponding to two tree persons, referred to as $TP_1$ and $TP_2$, from tree database 212. Tree persons $TP_1$ and $TP_2$ are generally selected from two different family trees, although in some embodiments they may be selected from the same family tree. In some embodiments, genealogical entity resolution system 200 includes a feature extractor for extracting features from the tree data and likewise tree persons $TP_1$ and $TP_2$, and from additional tree persons that are selected from tree database 212.

In some embodiments, genealogical entity resolution system 200 includes a feature comparator for generating various similarity scores and vectors based on the features extracted by the feature extractor. In some instances, the first feature vector $f_{1,i}$ and the second feature vector $f_{2,i}$ are used to generate a metric function $s(f_i)$, where $f_i$ is a combined feature vector. If the number of features is equal to N, then the feature comparator may calculate N different metrics between the first feature vector $f_{1,i}$ and the second feature vector $f_{2,i}$. For example, if n=2 and $f_{1,i}$=("John", 1956) and $f_{2,i}$=("John", 1958), then a first metric may be calculated based on the similarity between the two strings ("John" and "John") to be equal to 1, and a second metric may be calculated based on the difference between the two integers (1956 and 1958) to be equal to 0.83. The resulting metric function s(f) in this example would be equal to (1, 0.83). Metrics may yield values between 0 and 1, where 0 indicates low similarity and 1 indicates high similarity. In some embodiments, metrics are not restricted to yield values between 0 and 1.

In some embodiments, the Jaro-Winkler distance is used as the metric between two strings and cosine-similarity is used as the metric between any two non-strings, such as integers and vectors of normalized dates or normalized place identifiers. Other possible metrics that may be employed within the feature comparator include but are not limited to: edit distance, affine gap distance, Smith-Waterman distance, and Q-gram distance. When comparing features, it is clear to a person of ordinary skill in the art that similarity, dissimilarity, difference, or distance can be used to calculate how similar or different the features are.

In some embodiments, the feature comparator may generate a similarity score between tree persons (e.g., $TP_1$ and $TP_2$) using the following equation:

$$t = \sum_{i=1}^{N} w_i * s(f_i)$$

where N is the number of features $f_i$ and $w_i$ is the feature weight for the i-th feature $f_i$. The similarity score t is generated based on a weighted sum of metric function AM being weighted by feature weights $w_i$.

In some embodiments, genealogical entity resolution system 200 may modify cluster database 214 based on whether it is determined that tree persons $TP_1$ and $TP_2$ correspond to the same individual. In some instances, when it is determined that tree persons $TP_1$ and $TP_2$ correspond to the same individual, a new node connection is generated in cluster database 214 between a first node corresponding tree person $TP_1$ and a second node corresponding to tree person $TP_2$. In contrast, when it is determined that tree persons $TP_1$ and $TP_2$ do not correspond to the same individual, a node connection may be removed in cluster database 214 between a first node corresponding tree person $TP_1$ and a second node corresponding to tree person $TP_2$. In some embodiments, generating a new node connection or removing a previous node connection may include closing or opening an electrical switch in an electrical circuit within cluster database 214.

Figure 3:
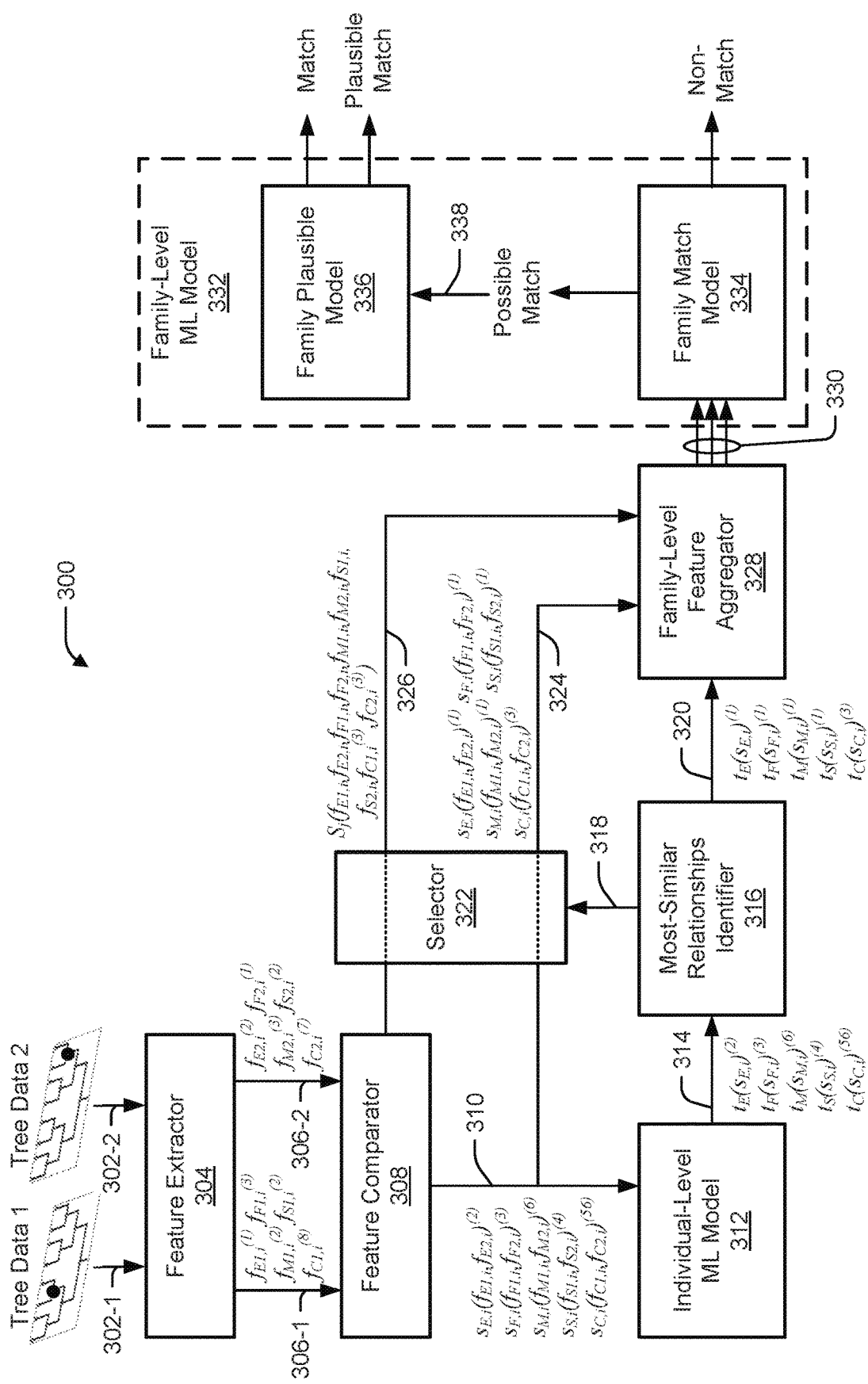
FIG. 3 illustrates a genealogical entity resolution system, according to some embodiments of the present invention.

FIG. 3 illustrates a genealogical entity resolution system 300 (or entity resolution system 300), according to some embodiments of the present invention. In some embodiments, genealogical entity resolution system 300 may determine whether two sets of data correspond to the same real-life individual. For example, genealogical entity resolution system 300 may receive first tree data 302-1 and second tree data 302-2 as input. Each of first tree data 302-1 and second tree data 302-2 may include various types of genealogy data regarding a particular tree person. As one example, first tree data 302-1 may include an obituary for a first tree person and second tree data 302-2 may include a wedding announcement for a second tree person. As another example, first tree data 302-1 may include names, birth dates, and death dates for a first tree person and the first tree person's father, mother, spouse, and children, and second tree data 302-2 may only include names for a second tree person and the second tree person's children.

In some embodiments, first tree data 302-1 and second tree data 302-2 are gathered from different genealogical trees in a tree database. For example, first tree data 302-1 may include all the data contained in the tree database corresponding to a first tree person (e.g., names, birth dates and locations, marriage dates and locations, death dates and locations for the first tree person and the first tree person's parents, spouse, siblings, and children) and second tree data 302-2 may include all the data contained in the tree database corresponding to a second tree person (e.g., names, birth dates and locations, marriage dates and locations, death dates and locations for the first tree person and the first tree person's parents, spouse, siblings, and children).

In some embodiments, each of first tree data 302-1 and second tree data 302-2 include data for additional tree persons that are from different family trees but belong to the same cluster as a particular tree person in a particular familial category. As an example, first tree data 302-1 may include data for the first tree person's father as well as data for two additional tree persons that belong to the same cluster as the first tree person's father. As another example, second tree data 302-2 may include data for the second tree person's spouse as well as data for one additional tree person that belongs to the same cluster as the second tree person's spouse.

In some embodiments, genealogical entity resolution system 300 includes a feature extractor 304 for extracting a first set of features 306-1 from first tree data 302-1 and a second set of features 306-2 from second tree data 302-2. For example, feature extractor 304 may extract features for the first tree person $f_{E1,i}$, features for the first tree person's father $f_{F1,i}$, features for the first tree person's mother $f_{M1,i}$, features for the first tree person's spouse $f_{S1,i}$, features for the first tree person's children $f_{C1,i}$, features for the second tree person $f_{E2,i}$, features for the second tree person's father $f_{F2,i}$, features for the second tree person's mother $f_{M2,i}$, features for the second tree person's spouse $f_{S2,i}$, and/or features for the second tree person's children $f_{C2,i}$. The number of features extracted for each tree person may be the same and may be indexed by i. In some examples, i may take on values between 1 and N, where N is the number of features extracted.

In some embodiments, feature extractor 304 may extract features for the additional tree persons that are from different family trees but belong to the same cluster as a particular tree person in a particular familial category. For example, if first tree data 302-1 includes data for the first tree person's father as well as data for two additional tree persons that belong to the same cluster as the first tree person's father, feature extractor 304 may extract three different versions of features for the first tree person's father $f_{F1,i}^{(3)}$. As another example, if second tree data 302-2 includes data for the second tree person's spouse as well as data for one additional tree person that belongs to the same cluster as the second tree person's spouse, feature extractor 304 may extract two different versions of features for the second tree person's spouse $f_{S2,i}^{(2)}$.

In some embodiments, genealogical entity resolution system 300 includes a feature comparator 308 for generating various similarity scores based on set of features 306. Feature comparator 308 may generate a similarity vector for a pair of features 306. Or, for example, feature comparator 308 may generate an individual-level similarity vector 310 for each possible pairing of tree persons from the first genealogical tree (as well as additional tree persons that belong to the same cluster as tree persons from the first genealogical tree) and tree persons from the second genealogical tree (as well as additional tree persons that belong to the same cluster as tree persons from the second genealogical tree).

For example, feature comparator 308 may generate an individual-level similarity vector $s_{E,i}(f_{E1,i},f_{E2,i})$ for the pairing of the first tree person and the second tree person (and additional pluralities of individual-level similarity scores for pairings of multiple versions of either), an individual-level similarity vector $s_{F,i}(f_{F1,i},f_{F2,i})$ for the pairing of the first tree person's father and the second tree person's father (and additional pluralities of individual-level similarity scores for pairings of multiple versions of either), an individual-level similarity vector $s_{M,i}(f_{M1,i},f_{M2,i})$ for the pairing of the first tree person's mother and the second tree person's mother (and additional pluralities of individual-level similarity scores for pairings of multiple versions of either), an individual-level similarity vector $s_{S,i}(f_{S1,i},f_{S2,i})$ for the pairing of the first tree person's spouse and the second tree person's spouse (and additional pluralities of individual-level similarity scores for pairings of multiple versions of either), and/or an individual-level similarity vector $s_{C,i}(f_{C1,i},f_{C2,i})$ for the pairing of the first tree person's children and the second tree person's children (and additional pluralities of individual-level similarity scores for pairings of multiple versions of either). The size (e.g., the number of values) of the individual-level similarity vectors generated for each possible pairing of tree persons may be the same and may be indexed by i, where i may take on values between 1 and N.

In some embodiments, genealogical entity resolution system 300 includes an individual-level ML model 312 for generating an individual-level similarity score 314 for each possible pairing of tree persons. In some instances, individual-level ML model 312 combines the N individual-level similarity scores for each of the individual-level similarity vectors 310 into a single, combined similarity score. For example, individual-level ML model 312 may generate an individual-level similarity score 314 for each possible pairing of tree persons from the first genealogical tree (as well as additional tree persons that belong to the same cluster as tree persons from the first genealogical tree) and tree persons from the second genealogical tree (as well as additional tree persons that belong to the same cluster as tree persons from the second genealogical tree).

For example, individual-level ML model 312 may generate an individual-level similarity score $t_E(s_{E,i})$ for the pairing of the first tree person and the second tree person (and additional individual-level similarity scores for pairings of multiple versions of either), an individual-level similarity score $t_F(s_{F,i})$ for the pairing of the first tree person's father and the second tree person's father (and additional individual-level similarity scores for pairings of multiple versions of either), an individual-level similarity score $t_M(s_{M,i})$ for the pairing of the first tree person's mother and the second tree person's mother (and additional individual-level similarity scores for pairings of multiple versions of either), an individual-level similarity score $t_S(s_{S,i})$ for the pairing of the first tree person's spouse and the second tree person's spouse (and additional individual-level similarity scores for pairings of multiple versions of either), and/or an individual-level similarity score $t_C(s_{C,i})$ for the pairing of the first tree person's children and the second tree person's children (and additional individual-level similarity scores for pairings of multiple versions of either).

In some embodiments, genealogical entity resolution system 300 includes a most-similar relationships identifier 316 for identifying a set of most-similar tree persons 318 from among the possible pairings of tree persons based on individual-level similarity scores 314. In some embodiments, most-similar relationships identifier 316 may identify the maximum individual-level similarity scores 320 of individual-level similarity scores 314 to identify the set of most-similar tree persons 318.

For example, most-similar relationships identifier 316 may identify the largest individual-level similarity score $t_E(s_{E,i})^{(1)}$ for the pairing of the first tree person and the second tree person, the largest individual-level similarity score $t_F(s_{F,i})^{(1)}$ for the pairing of the first tree person's father and the second tree person's father, the largest individual-level similarity score $t_M(s_{M,i})^{(1)}$ for the pairing of the first tree person's mother and the second tree person's mother, the largest individual-level similarity score $t_S(s_{S,i})^{(1)}$ for the pairing of the first tree person's spouse and the second tree person's spouse, and/or the top three largest individual-level similarity scores $t_M(s_{M,i})^{(3)}$ for the pairing of the first tree person's children and the second tree person's children.

In some embodiments, genealogical entity resolution system 300 includes a selector 322 for selecting a plurality of individual-level similarity vectors 324 for the set of most-similar tree persons 318. In some embodiments, the plurality of individual-level similarity vectors 324 for the set of most-similar tree persons 318 are selected from the individual-level similarity vectors 310. In some embodiments, feature comparator 308 generates the plurality of individual-level similarity vectors 324 for the set of most-similar tree persons 318.

In some embodiments, feature comparator 308 generates a plurality of family-level similarity scores 326 for the set of most-similar tree persons 318 based on set of features 306. For example, feature comparator 308 may generate a plurality of family-level similarity scores $S_j(f_{E1,i},f_{E2,i},f_{F1,i},f_{F2,i},f_{M1,i},f_{M2,i},f_{S1,i},f_{S2,i},f_{C1,i}^{(3)},f_{C2,i}^{(3)})$ which considers the similarity of features across the various familial relationships. The number of the plurality of family-level similarity scores generated for the set of most-similar tree persons 318 may be indexed by j, where j may take on values between 1 and M.

In some embodiments, genealogical entity resolution system 300 includes a family-level feature aggregator 328 which provides an aggregate input 330 to a family-level ML model 332. Aggregate input 330 may include the maximum individual-level similarity scores 320, the plurality of individual-level similarity vectors 324 for the set of most-similar tree persons 318, and/or the plurality of family-level similarity scores 326 for the set of most-similar tree persons 318.

In some embodiments, genealogical entity resolution system 300 includes a family-level ML model 332 that determines whether the first tree person and the second tree person correspond to the same individual based on aggregate input 330. In some embodiments, family-level ML model 332 includes a first stage for determining whether the first tree person and the second tree person are a non-match (do not correspond to the same individual) or a possible match (possibly correspond to the same individual) and a second stage for determining whether the first tree person are a match (correspond to the same individual) or a plausible match (maybe correspond to the same individual).

In some embodiments, the first stage is implemented using a family match model 334, which may be a ML model such as a neural network. In some embodiments, the second stage is implemented using a family plausible model 336, which may also be a ML model such as a neural network. While family match model 334 operates on aggregate input 330, family plausible model 336 operates on a subset input 338 that includes aggregate input 330 only when a possible match is determined. As such, family plausible model 336 can be fine-tuned during training to decide between match and plausible match cases.

FIGS. 4A-4G illustrate various steps that are performable by genealogical entity resolution system 300 for determining whether two tree persons, tree person D8 and tree person E5, correspond to the same individual, according to some embodiments of the present invention. In the example shown, tree persons D1-D16 may be from one family tree and tree persons E1-E15 may be from a different family tree. Alternatively, tree persons D1-D16 and/or E1-E15 may be from a multiple family trees but each familial category (ego, mother, father, spouse, children) belongs to the same cluster grouping as the tree persons shown in familial categories 302.

Figure 4A:
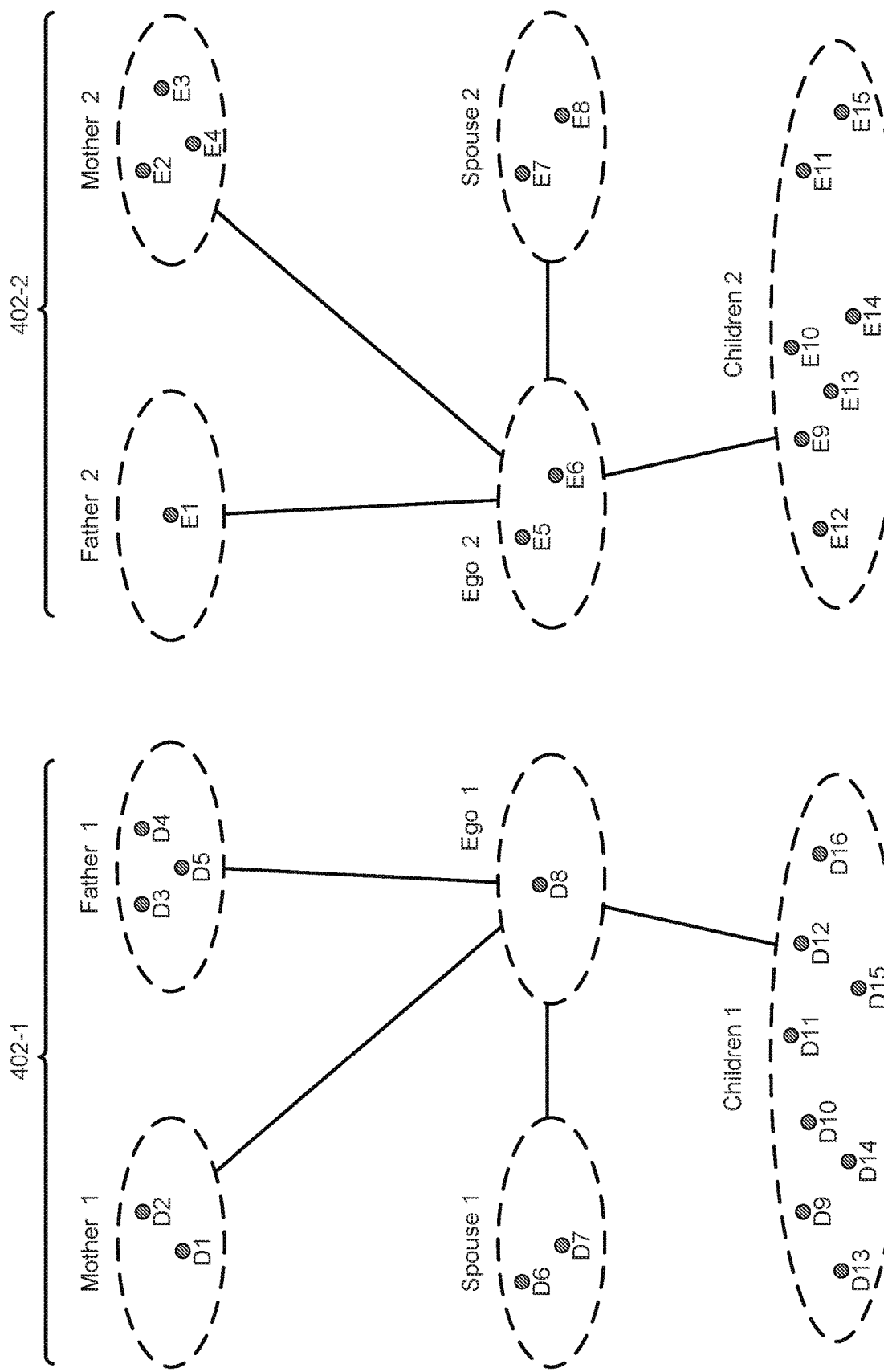
FIGS. 4A-4G illustrate various steps that are performable by genealogical entity resolution system for determining whether two tree persons correspond to the same individual, according to some embodiments of the present invention.

In reference to FIG. 4A, each familial category of familial categories 302 is considered to have two parts, e.g., Mother 1 and Mother 2 are collectively considered to be a single familial category, Father 1 and Father 2 are collectively considered to be a single familial category, Ego 1 and Ego 2 are collectively considered to be a single familial category, etc. Each familial category includes at least one tree person from each of the family trees of the tree persons being compared (tree person D8 and tree person E5). In some embodiments, familial categories 402 only include tree persons from the family trees of the tree persons being compared. In other embodiments, such as the example shown in FIG. 4A, additional tree persons that are from different family trees but belong to the same cluster as the tree person in the familial category may be included. For example, tree person D2 may share a cluster with tree person D1 (as indicated by cluster database 214) and may be included in the same familial category (Mother) as tree person D1. Also, each of tree persons D4 and D5 may share a cluster with tree person D3 (as indicated by cluster database 214) and may be included in the same familial category (Father) as tree person D3. Furthermore, each of tree persons D13-D16 may share a cluster with one of tree persons D9-D12 (as indicated by cluster database 214) and may be included in the same familial category (Children) as tree persons D9-D12.

After familial categories 402 have been identified, a set of features 306 may be extracted from each of the tree persons shown in FIG. 4A. Feature extraction may be performed by feature extractor 304, which may retrieve and/or receive the information from tree database 212. In reference to FIGS. 4B-4F, feature comparator 308 may generate an individual-level similarity vector 310 for each possible pairing of tree persons in each familial category, and individual-level ML model 312 may generate a plurality of individual-level similarity scores based on the similarity vectors.

Figure 4B:
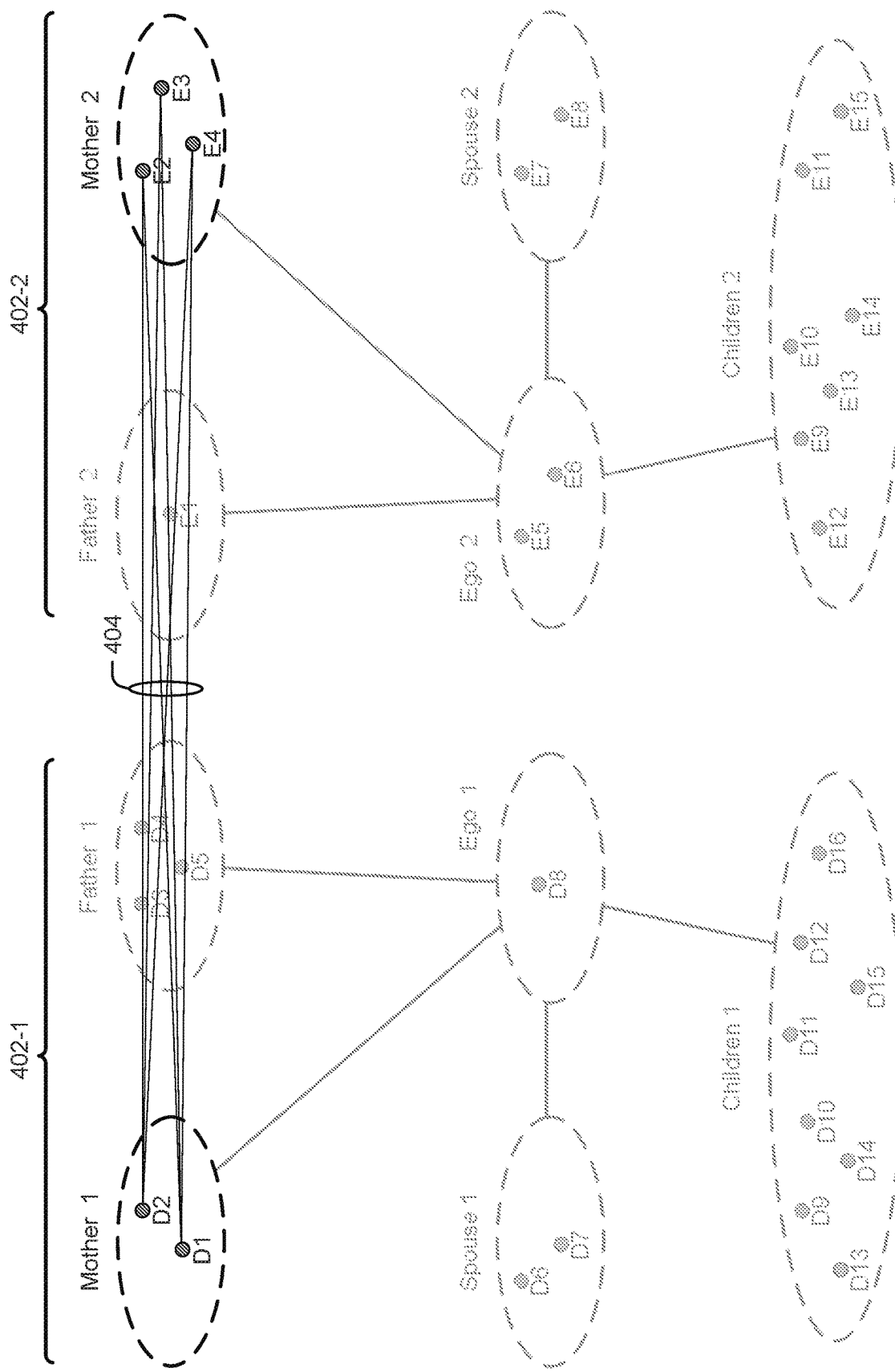

For example, in reference to FIG. 4B, individual-level similarity scores 404 are generated between the following pairings of tree persons in the Mother familial category: D1:E2, D1:E3, D1:E4, D2:E2, D2:E3, and D2:E4 (6 total). Next, the highest (i.e., maximum) individual-level similarity score is identified and the corresponding tree persons are identified as the most-similar tree persons for the familial category. In the present example, the maximum individual-level similarity score corresponds to the pairing of tree persons D2 and E4.

Figure 4C:
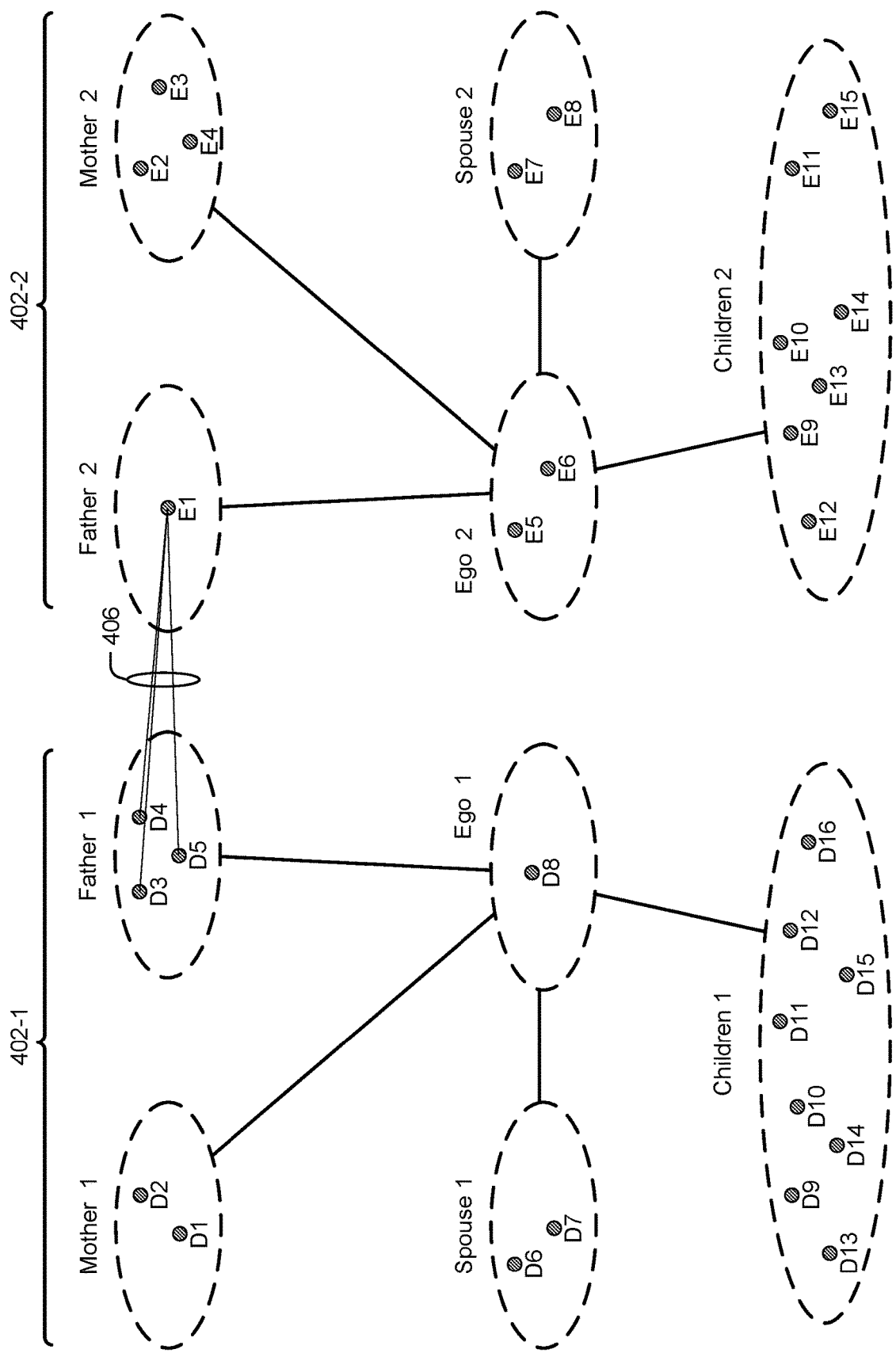

In reference to FIG. 4C, individual-level similarity scores 406 are generated between the following pairings of tree persons in the Father familial category: D3:E1, D4:E1, and D5:E1 (3 total). Next, the highest (i.e., maximum) individual-level similarity score is identified and the corresponding tree persons are identified as the most-similar tree persons for the familial category. In the present example, the maximum individual-level similarity score corresponds to the pairing of tree persons D3 and E1.

Figure 4D:
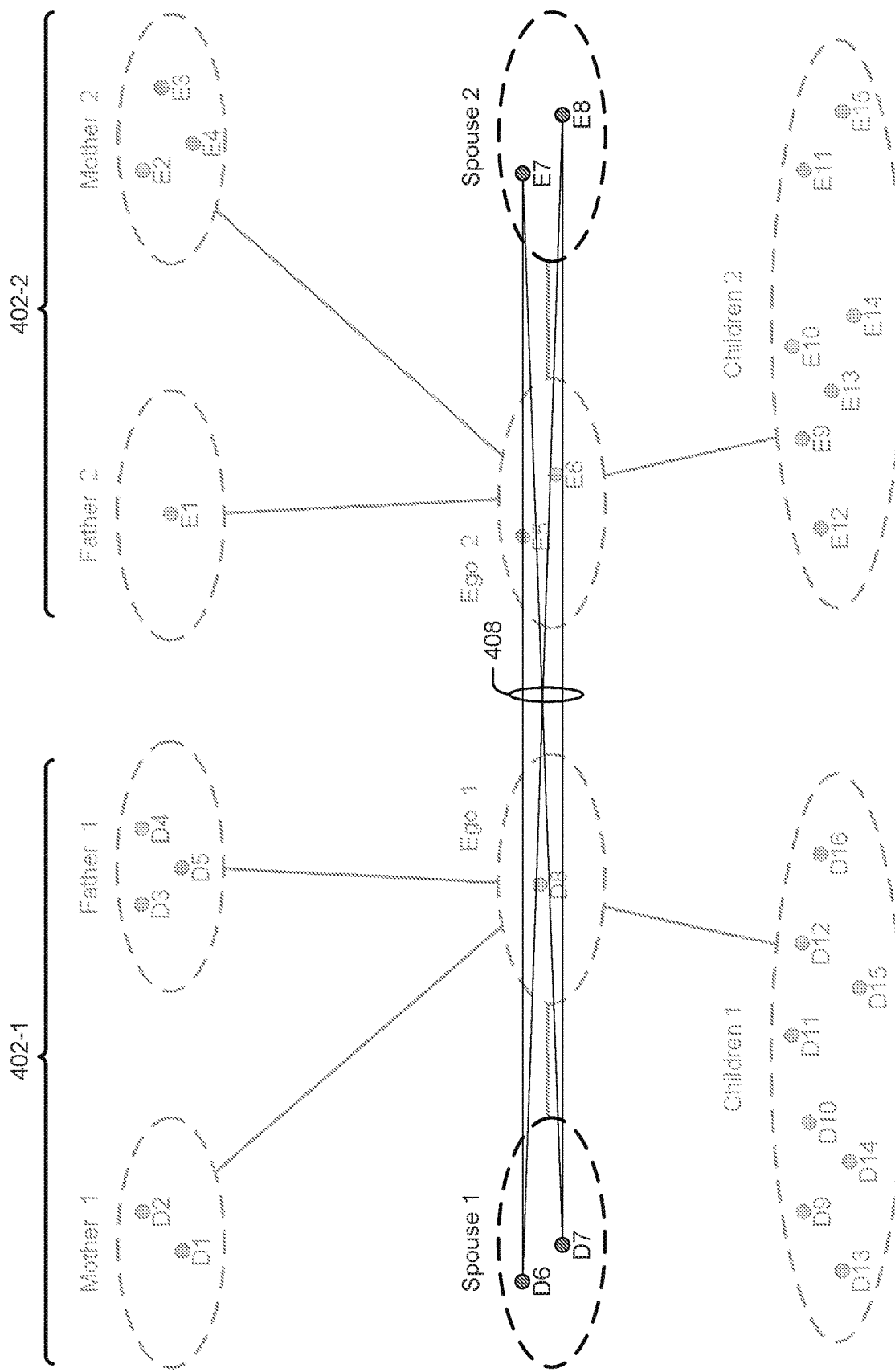

In reference to FIG. 4D, individual-level similarity scores 408 are generated between the following pairings of tree persons in the Spouse familial category: D6:E7, D6:E8, D7:E7, and D7:E8 (4 total). Next, the highest (i.e., maximum) individual-level similarity score is identified and the corresponding tree persons are identified as the most-similar tree persons for the familial category. In the present example, the maximum individual-level similarity score corresponds to the pairing of tree persons D6 and E7.

Figure 4E:
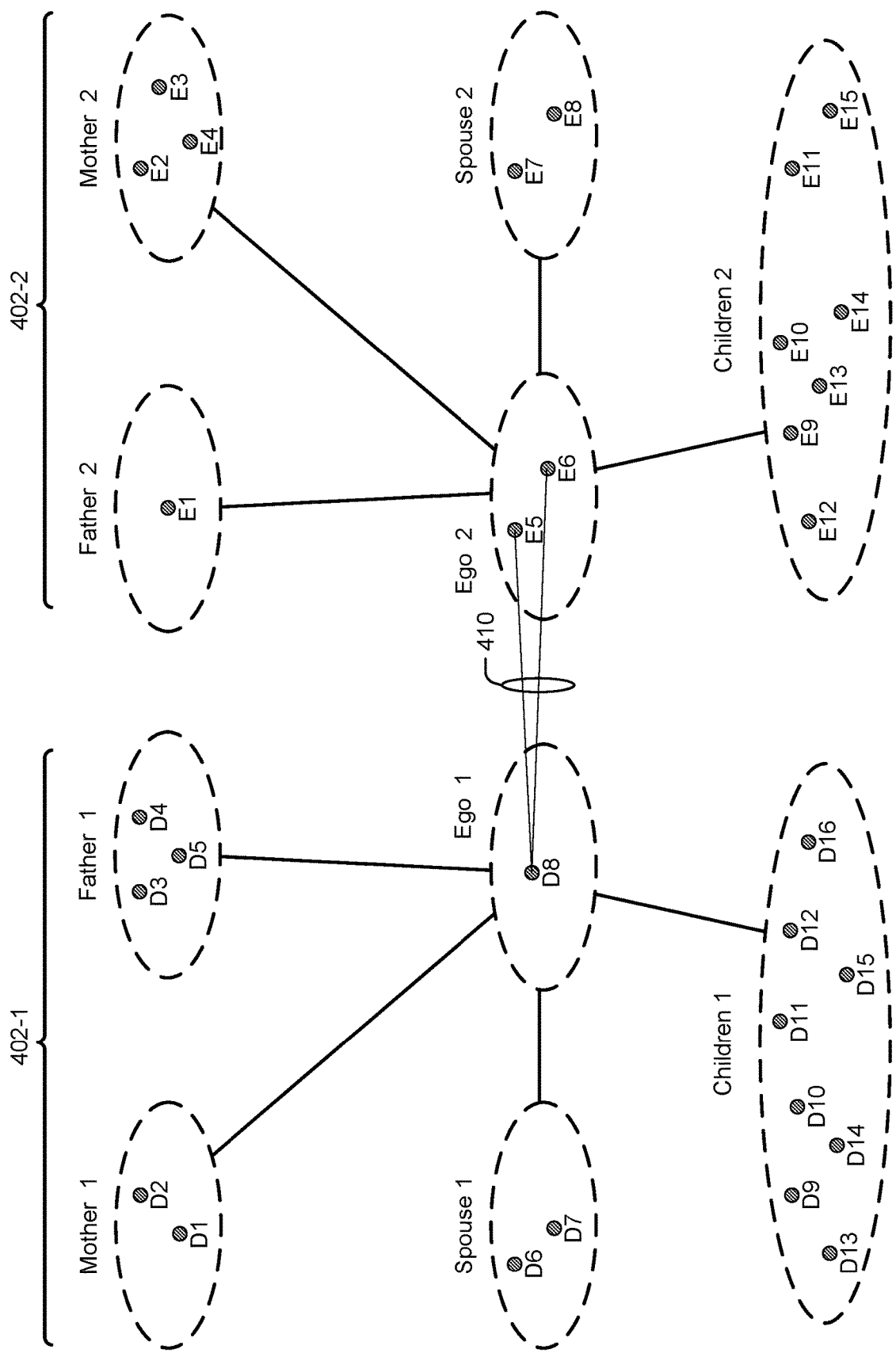

In reference to FIG. 4E, individual-level similarity scores 410 are generated between the following pairings of tree persons in the Ego familial category: D8:E5 and D8:E6 (2 total). Next, the highest (i.e., maximum) individual-level similarity score is identified and the corresponding tree persons are identified as the most-similar tree persons for the familial category. In the present example, the maximum individual-level similarity score corresponds to the pairing of tree persons D8 and E6.

Figure 4F:
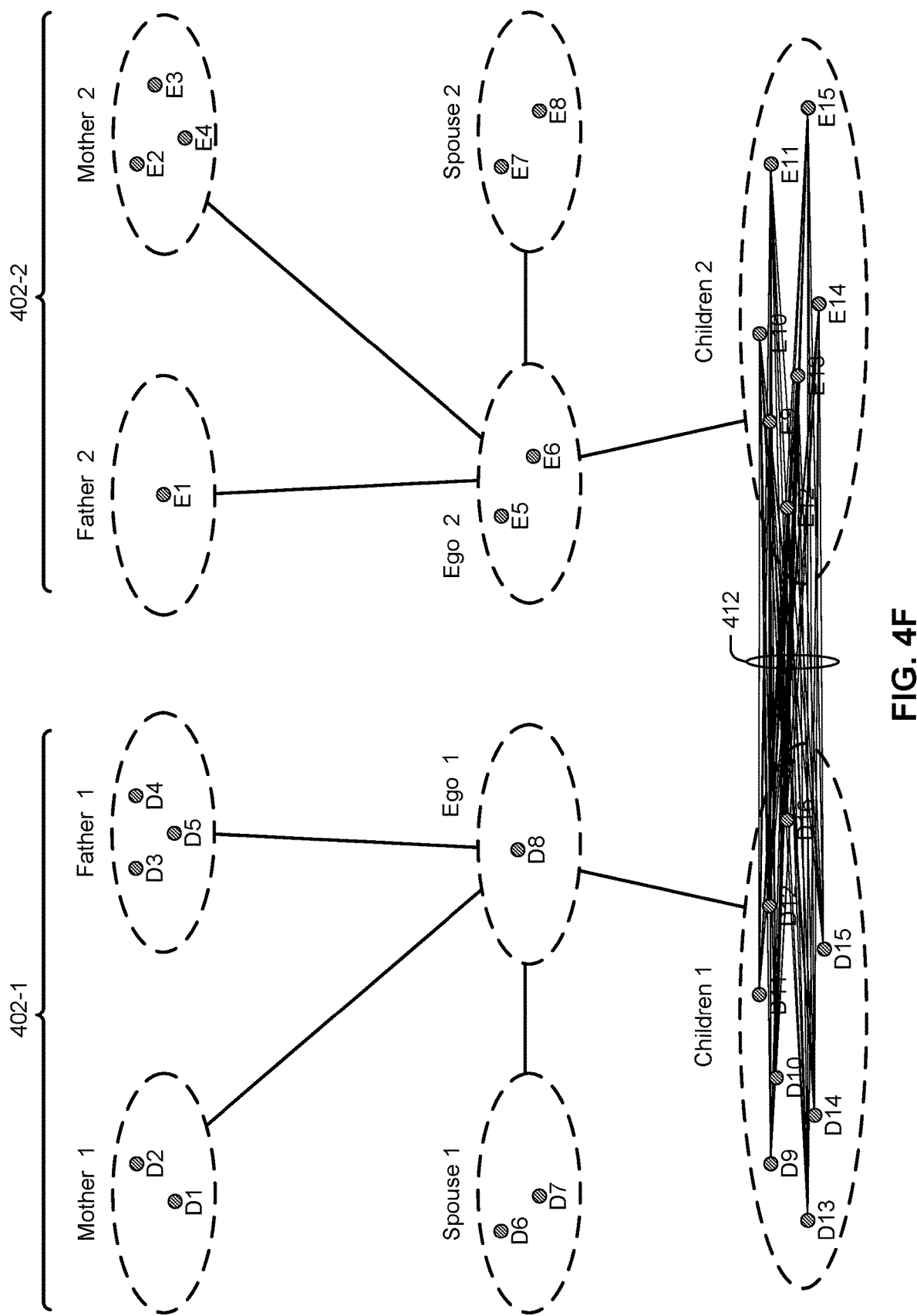

In reference to FIG. 4F, individual-level similarity scores 412 are generated between the following pairings of tree persons in the Children familial category: D9:E9, D9:E10, D9:E11, D9:E12, D9:E13, D9:E14, D9:E15, D10:E9, D10:E10, D10:E11, D10:E12, D10:E13, D10:E14, D10:E15, D11:E9, D11:E10, D11:E11, D11:E12, D11:E13, D11:E14, D11:E15, D12:E9, D12:E10, D12:E11, D12:E12, D12:E13, D12:E14, D12:E15, D13:E9, D13:E10, D13:E11, D13:E12, D13:E13, D13:E14, D13:E15, D14:E9, D14:E10, D14:E11, D14:E12, D14:E13, D14:E14, D14:E15, D15:E9, D15:E10, D15:E11, D15:E12, D15:E13, D15:E14, D15:E15, D16:E9, D16:E10, D16:E11, D16:E12, D16:E13, D16:E14, and D16:E15 (56 total). In some embodiments, the highest (i.e., maximum) three individual-level similarity scores are identified and the corresponding tree persons are identified as the most-similar tree persons for the familial category. The highest three individual-level similarity scores may be the highest three individual-level similarity scores with unique tree persons. In the present example, the maximum individual-level similarity score corresponds to the following pairings of tree persons: D9:E14, D13:E10, and D15:E11.

Figure 4G:
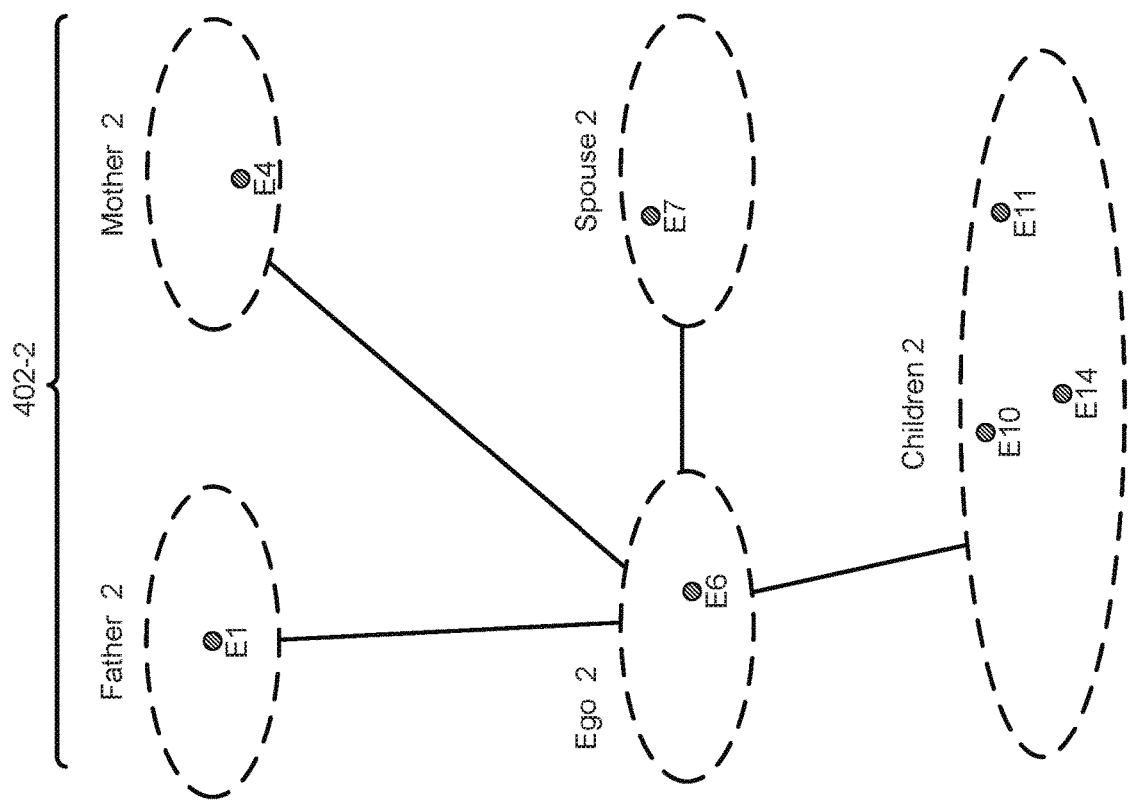

In reference to FIG. 4G, the set of most-similar tree persons 318 for the present example is illustrated. In some instances, most-similar relationships identifier 316 may identify the set of most-similar tree persons 318 by identifying the maximum values of the individual-level similarity scores 314.

Figure 5A:
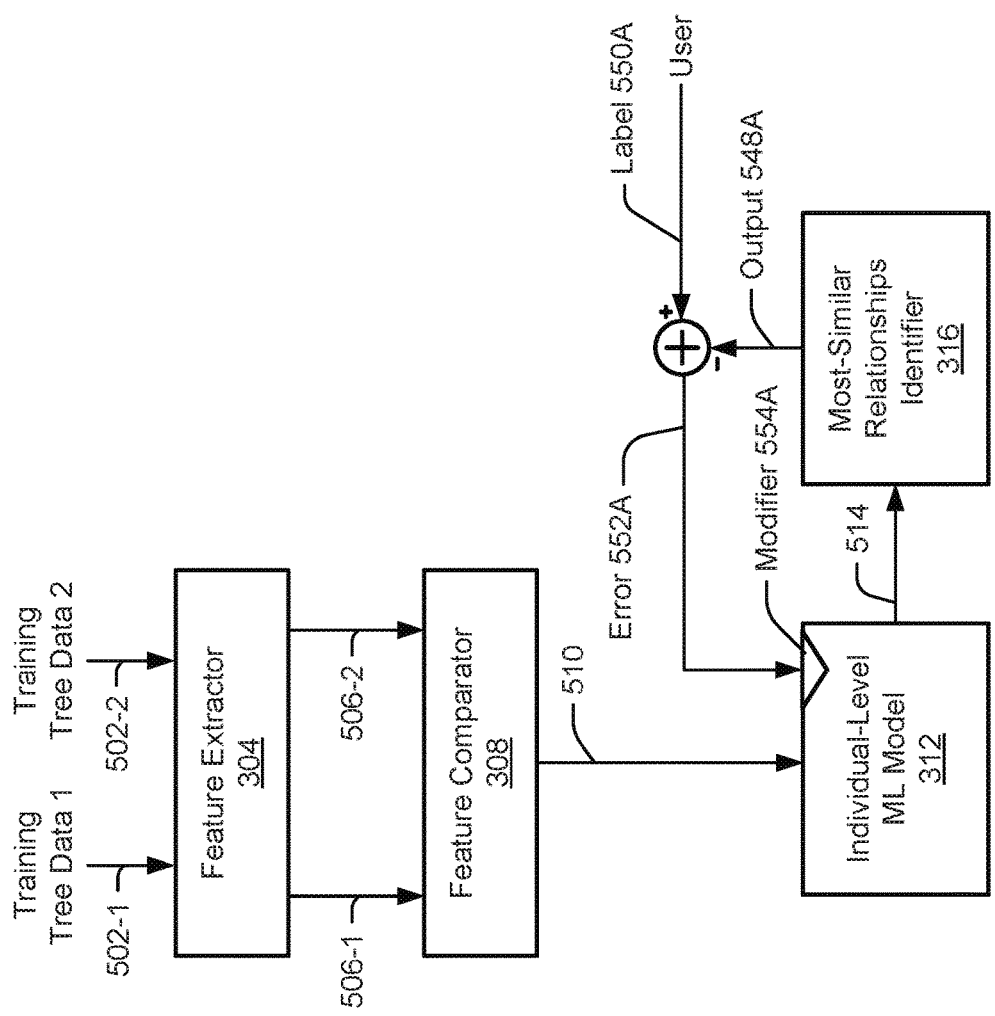
FIGS. 5A-5C illustrate example training steps for training the models of a genealogical entity resolution system, according to some embodiments of the present invention.
Figure 5B:
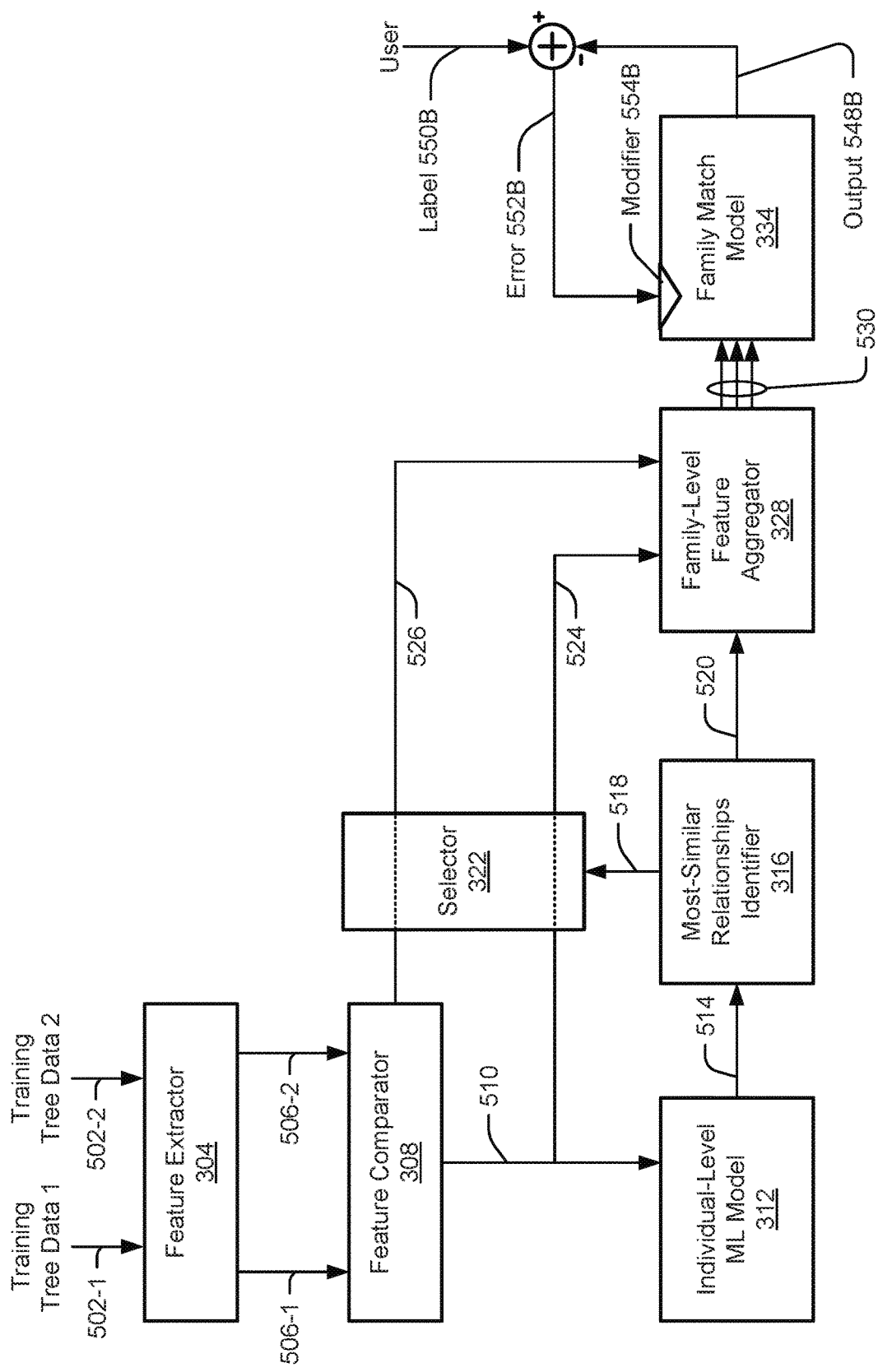
Figure 5C:
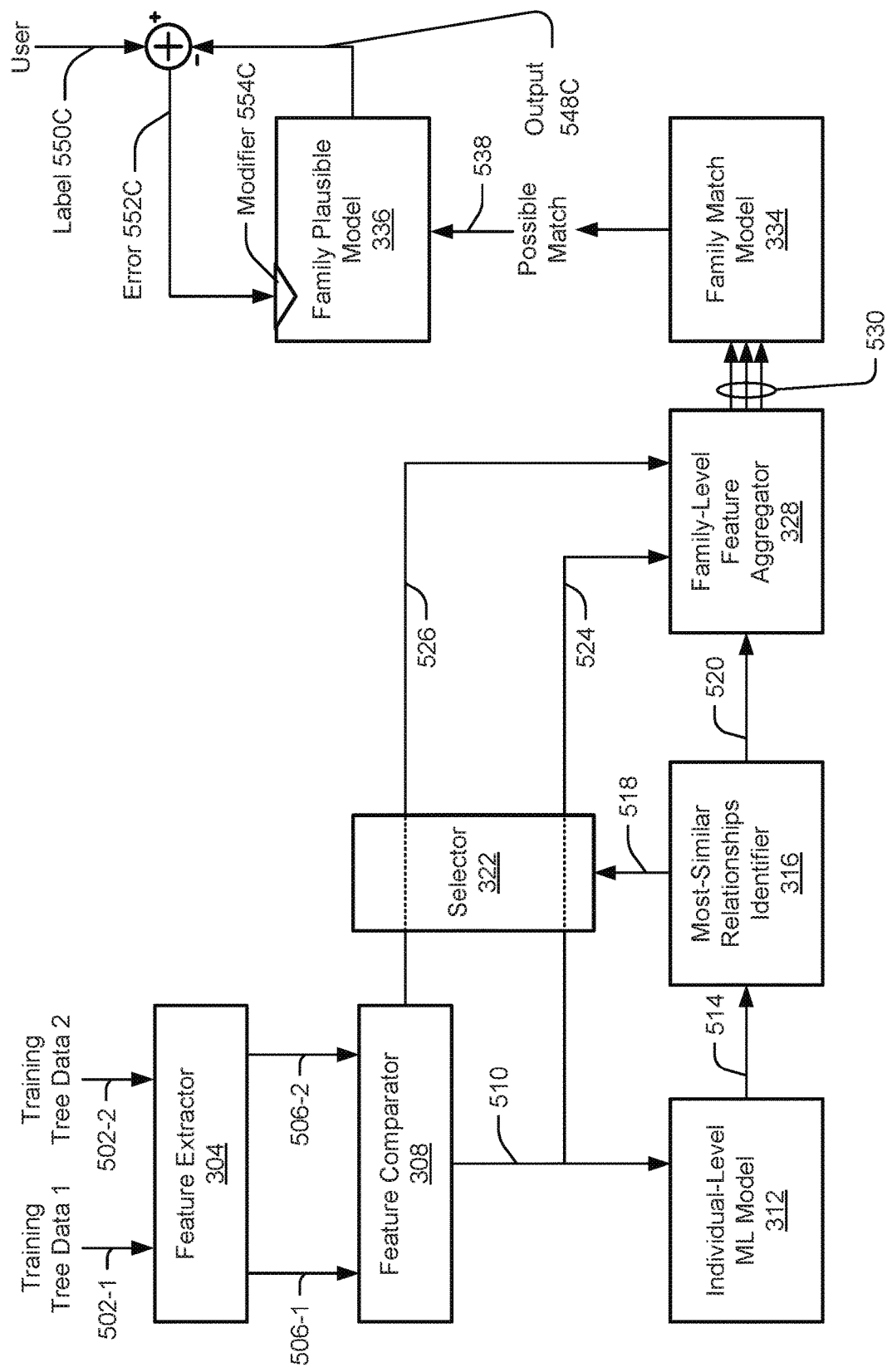

FIGS. 5A-5C illustrate example training steps for training the ML models of genealogical entity resolution system 300, according to some embodiments of the present invention. The ML models may be trained sequentially in the illustrated order so as to improve the functionality of each individual ML model.

FIG. 5A illustrates a diagram showing an example training phase of individual-level ML model 312. During the training phase, training tree data 502 may be provided to genealogical entity resolution system 300. Training tree data 502 may include first training tree data 502-1 and second training tree data 502-2, each of which may include various types of genealogy data regarding a particular tree person, similar to that described in reference to tree data 302. Feature extractor 304 may extract a first set of features 506-1 from first training tree data 502-1 and a second set of features 506-2 from second training tree data 502-2. Based on set of features 506, feature comparator 308 may generate an individual-level similarity vector 510. Individual-level ML model 312 may then generate an output 548A comprising an individual-level similarity score.

In some instances, a user may examine training tree data 502 and create a label 550A through a computer interface indicating an individual-level similarity score based on the user's examination of training tree data 502. Label 550A is compared to output 548A to generate an error 552A, which may represent the difference between output 548A and label 550A. In some instances, individual-level ML model 312 is then modified by a modifier 554A based on error 552A. Modifier 554A may change weights associated with individual-level ML model 312 such that the predicted individual-level similarity score better approximates label 550A during subsequent inferences. This process is then repeated for multiple training tree data 502 and user-provided labels.

FIG. 5B illustrates a diagram showing an example training phase of family match model 334. During the training phase, training tree data 502 may be provided to genealogical entity resolution system 300. Based on training tree data 502, feature comparator 308 may generate an individual-level similarity vector 510 for each possible pairing of tree persons and individual-level ML model 312 may then generate an individual-level similarity score 514 for each possible pairing of tree persons. An aggregate input 530 may be provided to family match model 334 including the maximum individual-level similarity scores 520, the plurality of individual-level similarity vectors 524 for the set of most-similar tree persons 518, and/or the plurality of family-level similarity scores 526 for the set of most-similar tree persons 518. Based on aggregate input 530, family-level ML model 332 may provide an output 548B indicating whether the first tree person and the second tree person are a non-match or a possible match.

In some instances, a user may examine training tree data 502 and create a label 550B through a computer interface indicating whether the first tree person and the second tree person are a non-match or a possible match. Label 550B is compared to output 548B to generate an error 552B, which may represent the difference between output 548B and label 550B. In some instances, family match model 334 is then modified by a modifier 554B based on error 552B. Modifier 554B may change weights associated with family match model 334 such that predictions better approximate label 550B during subsequent inferences. This process is then repeated for multiple training tree data 502 and user-provided labels.

FIG. 5C illustrates a diagram showing an example training phase of family plausible model 336. During the training phase, training tree data 502 may be provided to genealogical entity resolution system 300. Based on training tree data 502, a subset input 538 may be provided to family plausible model 336. Based on subset input 538, family plausible model 336 may provide an output 548C indicating whether the first tree person and the second tree person are a match or a plausible match.

In some instances, a user may examine training tree data 502 and create a label 550C through a computer interface indicating whether the first tree person and the second tree person are a match or a plausible match. Label 550C is compared to output 548C to generate an error 552C, which may represent the difference between output 548C and label 550C. In some instances, family plausible model 336 is then modified by a modifier 554C based on error 552C. Modifier 554C may change weights associated with family plausible model 336 such that predictions better approximate label 550C during subsequent inferences. This process is then repeated for multiple training tree data 502 and user-provided labels.

Figure 6:
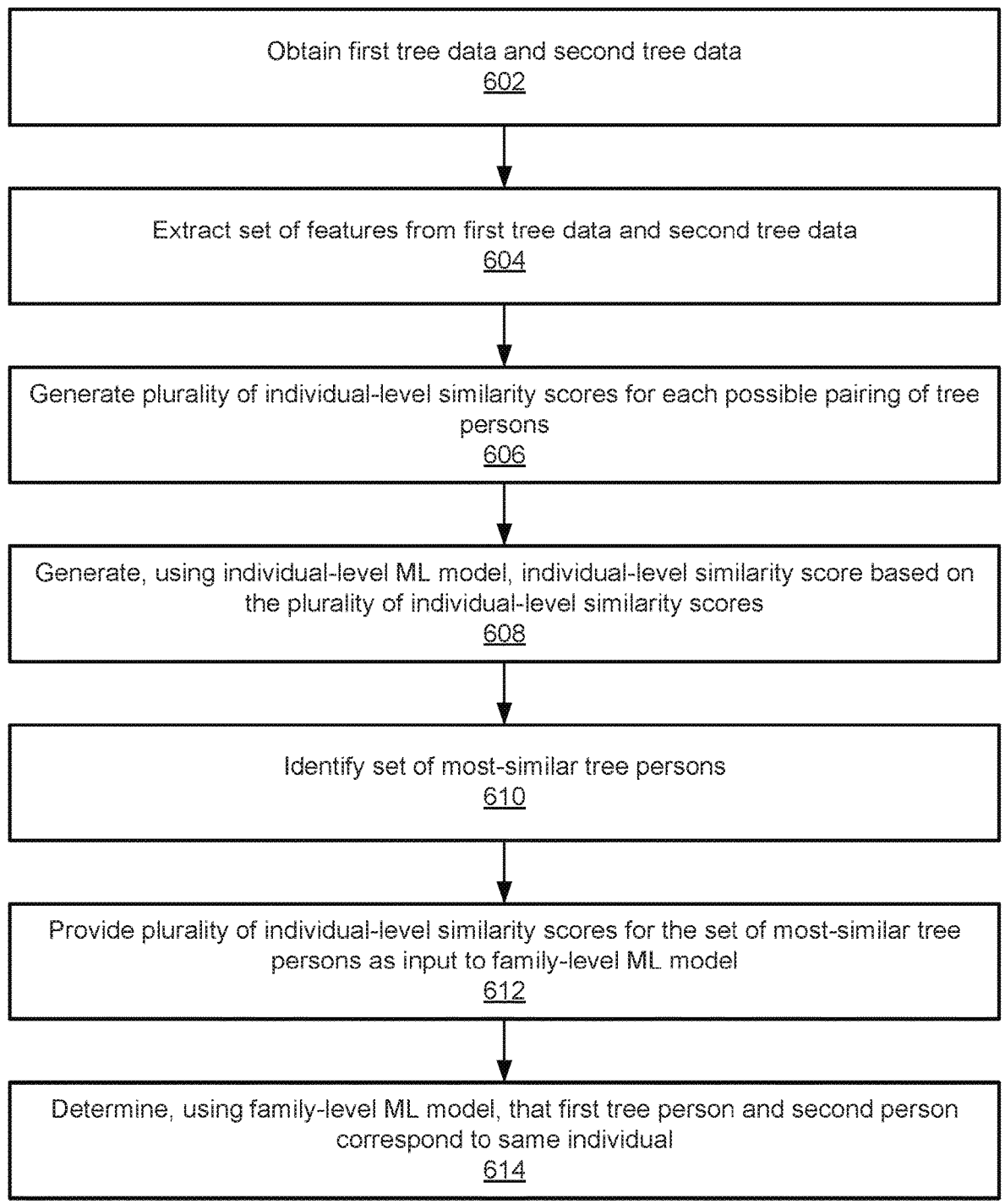
FIG. 6 illustrates an example method, according to some embodiments of the present invention.

FIG. 6 illustrates an example method 600, according to some embodiments of the present invention. One or more steps of method 600 may be performed in an order different than that shown in FIG. 6, and one or more steps of method 600 may be omitted during performance of method 600.

At step 602, first tree data and second tree data are obtained. In some embodiments, the first tree data and the second tree data are obtained from a genealogical database. In some embodiments, the first tree data and the second tree data are obtained from a variety of genealogical records, user-generated content, or clustered data. In some embodiments, the first tree data corresponds to a first tree person from a first genealogical tree and the second tree data corresponds to a second tree person from a second genealogical tree.

At step 604, a set of features are extracted from the first tree data and the second tree data.

At step 606, an individual-level similarity vector is generated for each possible pairing of tree persons from the first genealogical tree and the second genealogical tree.

At step 608, a (combined) individual-level similarity score is generated for each possible pairing of tree persons in each familial category based on the individual-level similarity vector for each possible pairing of tree persons. In some embodiments, the individual-level similarity score is generated by an individual-level ML model.

At step 610, a set of most-similar tree persons from the first genealogical tree and the second genealogical tree for each familial category are identified based on the individual-level similarity score.

At step 612, a plurality of individual-level similarity vectors for the set of most-similar tree persons are provided as input to a family-level ML model.

At step 614, it is determined, using the family-level ML model, that the first tree person and the second tree person correspond to a non-match, match, or plausible match based on the plurality of individual-level similarity vectors for the set of most-similar tree persons.

Figure 7:
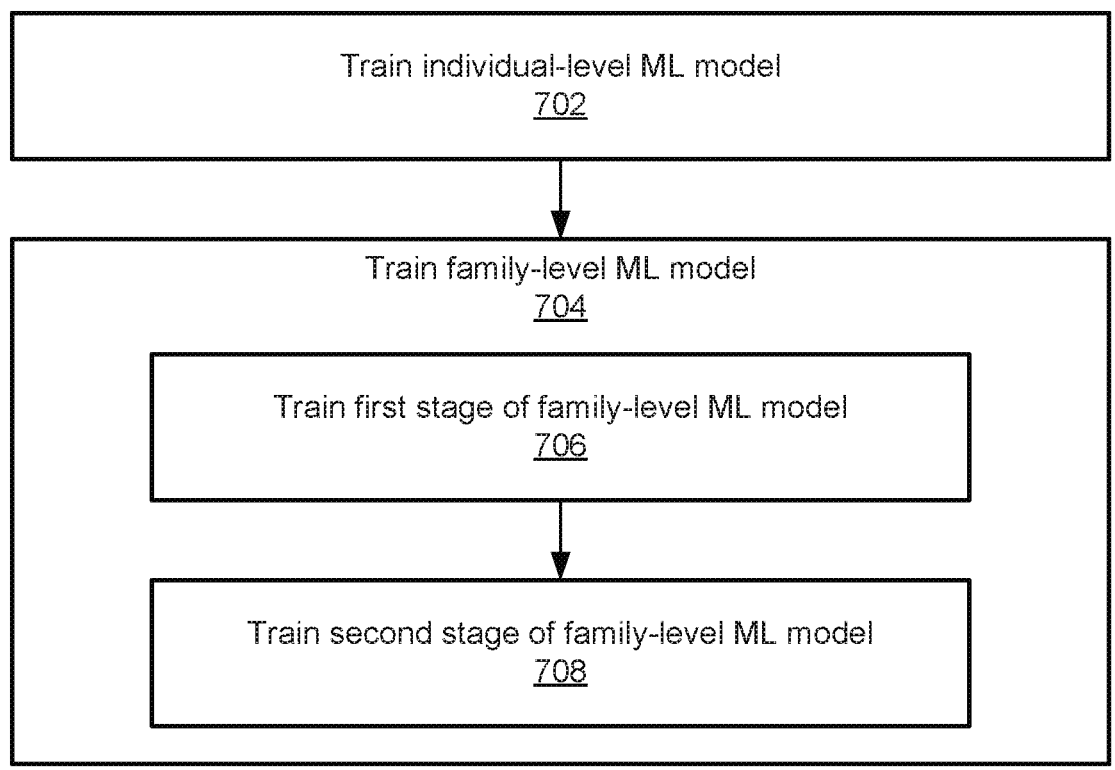
FIG. 7 illustrates an example method, according to some embodiments of the present invention.

FIG. 7 illustrates an example method 700, according to some embodiments of the present invention. One or more steps of method 700 may be performed in an order different than that shown in FIG. 7, and one or more steps of method 700 may be omitted during performance of method 700.

At step 702, an individual-level ML model is trained. In some embodiments, the individual-level ML model is trained using user-prepared labels and/or training tree data.

At step 704, a family-level ML model is trained. In some embodiments, the family-level ML model is trained using user-prepared labels and/or training tree data.

At step 706, a first stage of the family-level ML model is trained. In some embodiments, the first stage of the family-level ML model is trained using user-prepared labels and/or training tree data.

At step 708, a second stage of the family-level ML model is trained. In some embodiments, the second stage of the family-level ML model is trained using user-prepared labels and/or training tree data.

Figure 8:
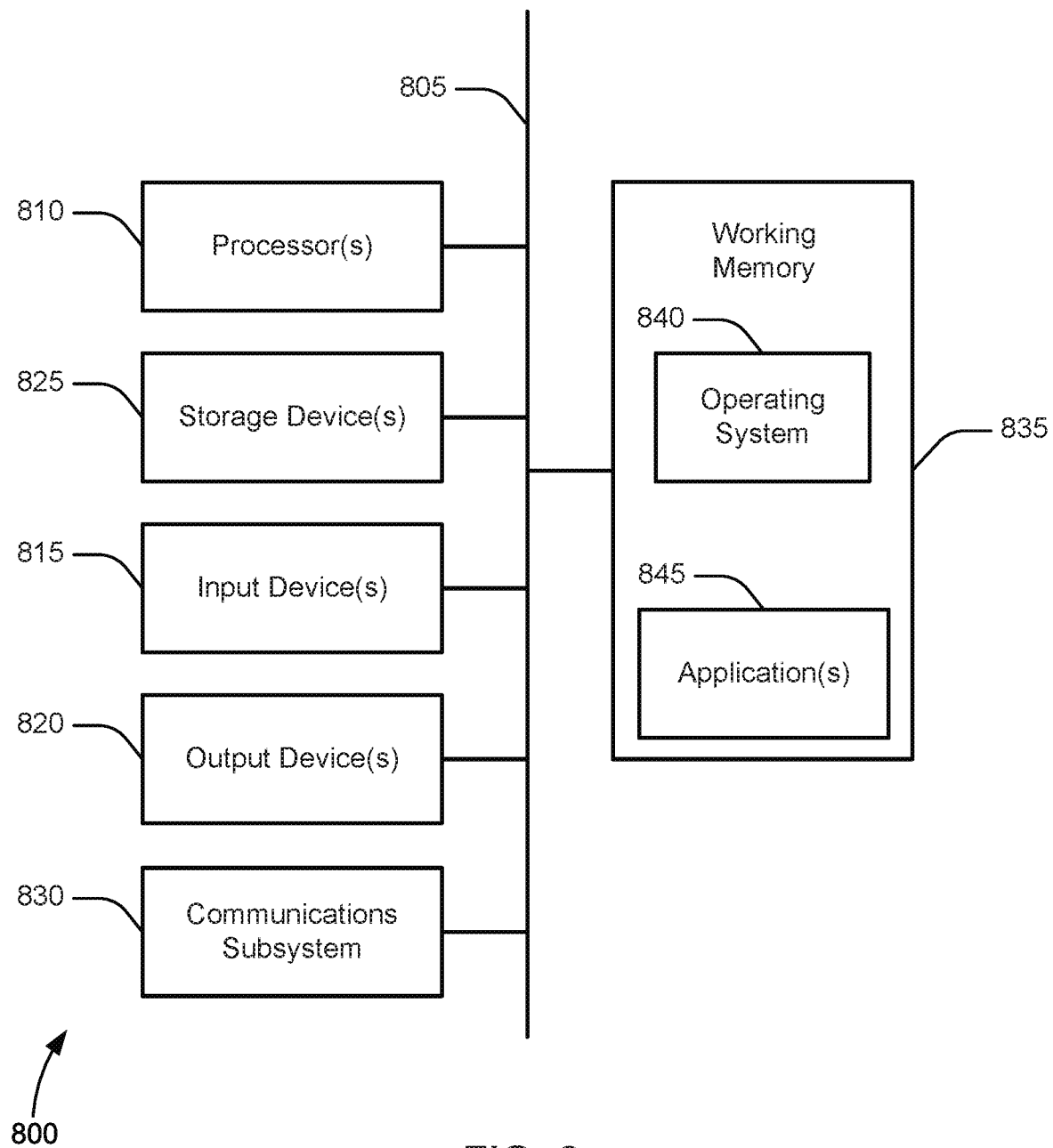
FIG. 8 illustrates a simplified computer system, according to some embodiments of the present invention.

FIG. 8 shows a simplified computer system 800, according to some embodiments of the present invention. FIG. 8 provides a schematic illustration of one embodiment of a computer system 800 that can perform some or all of the steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805, or may otherwise be in communication, as appropriate. The hardware elements may include one or more processors 810, including without limitation one or more general-purpose processors and/or one or more special-purpose processors such as digital signal processing chips, graphics acceleration processors, and/or the like; one or more input devices 815, which can include without limitation a mouse, a keyboard, a camera, and/or the like; and one or more output devices 820, which can include without limitation a display device, a printer, and/or the like.

The computer system 800 may further include and/or be in communication with one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 830 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 830. In other embodiments, a portable electronic device, e.g. the first electronic device, may be incorporated into the computer system 800, e.g., an electronic device as an input device 815. In some embodiments, the computer system 800 will further comprise a working memory 835, which can include a RAM or ROM device, as described above.

The computer system 800 also can include software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 8, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 825 described above. In some cases, the storage medium might be incorporated within a computer system, such as computer system 800. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 800 to perform methods in accordance with various embodiments of the technology. According to a set of embodiments, some or all of the procedures of such methods are performed by the computer system 800 in response to processor 810 executing one or more sequences of one or more instructions, which might be incorporated into the operating system 840 and/or other code, such as an application program 845, contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 and/or components thereof generally will receive signals, and the bus 805 then might carry the signals and/or the data, instructions, etc. carried by the signals to the working memory 835, from which the processor(s) 810 retrieves and executes the instructions. The instructions received by the working memory 835 may optionally be stored on a non-transitory storage device 825 either before or after execution by the processor(s) 810.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A computer-implemented method comprising:
    extracting a first set of features from a first set of tree data and a second set of features from a second set of tree data, wherein the first set of tree data corresponds to a first tree person from a first genealogical tree and the second set of tree data corresponds to a second tree person from a second genealogical tree, and wherein each of the first genealogical tree and the second genealogical tree comprise a plurality of interconnected nodes representing relationships between tree persons;
    generating, utilizing a feature comparator to compare the first set of features and the second set of features:
        an individual-level similarity vector comprising paired individual-level features from paired tree persons, wherein the paired tree persons include: i) one or more of the first tree person or a first relative related to the first tree person and ii) one or more of the second tree person or a second relative related to the second tree person; and
        a family-level similarity score from features across familial relationships of the paired tree persons;
    generating, utilizing an individual-level machine learning model to analyze the individual-level similarity vector, an individual-level similarity score defining a similarity between the paired tree persons;
    determining, utilizing a family-level machine learning model based on the individual-level similarity score and the family-level similarity score, that the first tree person and the second tree person are duplicates of a single individual; and
    modifying a cluster database based on determining that the first tree person and the second tree person are duplicates of the single individual.

2. The computer-implemented method of claim 1, wherein at least one of the individual-level machine learning model or the family-level machine learning model is a neural network.

3. The computer-implemented method of claim 1, wherein generating the individual-level similarity vector comprises:
    determining the paired tree persons to include a first individual from the first genealogical tree and a second individual from the second genealogical tree; and
    generating the individual-level similarity vector to include features from the first individual and the second individual.

4. The computer-implemented method of claim 1, wherein generating the family-level similarity score comprises generating a vector based on similarities between familial relationships of the paired tree persons.

5. The computer-implemented method of claim 1, wherein determining that the first tree person and the second tree person are duplicates of the single individual comprises using a feature aggregator to combine the individual-level similarity score and the family-level similarity score.

6. The computer-implemented method of claim 1, wherein generating the individual-level similarity score comprises generating a similarity score based on individual data that does not include relationship data among tree persons.

7. The computer-implemented method of claim 5, wherein the family-level machine learning model includes a first stage and a second stage, wherein the first stage determines whether the first tree person and the second tree person do not correspond to the single individual, and wherein the second stage determines whether the first tree person and the second tree person correspond to the single individual.

8. A non-transitory computer-readable medium comprising instructions that, when executed by one or more processors, cause the one or more processors to perform operations comprising:
- extracting a first set of features from a first set of tree data and a second set of features from a second set of tree data, wherein the first set of tree data corresponds to a first tree person from a first genealogical tree and the second set of tree data corresponds to a second tree person from a second genealogical tree, and wherein each of the first genealogical tree and the second genealogical tree comprise a plurality of interconnected nodes representing relationships between tree persons;
- generating, utilizing a feature comparator to compare the first set of features and the second set of features:
  - an individual-level similarity vector comprising paired individual-level features from paired tree persons, wherein the paired tree persons include: i) one or more of the first tree person or a first relative related to the first tree person and ii) one or more of the second tree person or a second relative related to the second tree person; and
  - a family-level similarity score from features across familial relationships of the paired tree persons;
- generating, utilizing an individual-level machine learning model to analyze the individual-level similarity vector, an individual-level similarity score defining a similarity between the paired tree persons;
- determining, utilizing a family-level machine learning model based on the individual-level similarity score and the family-level similarity score, that the first tree person and the second tree person are duplicates of a single individual; and
- modifying a cluster database based on determining that the first tree person and the second tree person are duplicates of the single individual.

9. The non-transitory computer-readable medium of claim 8, wherein at least one of the individual-level machine learning model or the family-level machine learning model is a neural network.

10. The non-transitory computer-readable medium of claim 8, wherein generating the individual-level similarity vector comprises:
- determining the paired tree persons to include a first individual from the first genealogical tree and a second individual from the second genealogical tree; and
- generating the individual-level similarity vector to include features from the first individual and the second individual.

11. The non-transitory computer-readable medium of claim 8, wherein generating the family-level similarity score comprises generating a vector based on similarities between familial relationships of the paired tree persons.

12. The non-transitory computer-readable medium of claim 8, wherein determining that the first tree person and the second tree person are duplicates of the single individual comprises using a feature aggregator to combine the individual-level similarity score and the family-level similarity score.

13. The non-transitory computer-readable medium of claim 8, wherein generating the individual-level similarity score comprises generating a similarity score based on individual data that does not include relationship data among tree persons.

14. The non-transitory computer-readable medium of claim 12, wherein the family-level machine learning model includes a first stage and a second stage, wherein the first stage determines whether the first tree person and the second tree person do not correspond to the single individual, and wherein the second stage determines whether the first tree person and the second tree person correspond to the single individual.

15. A system comprising:
- one or more processors; and
- a computer-readable medium comprising instructions that, when executed by the one or more processors, cause the one or more processors to perform operations comprising:
- extracting a first set of features from a first set of tree data and a second set of features from a second set of tree data, wherein the first set of tree data corresponds to a first tree person from a first genealogical tree and the second set of tree data corresponds to a second tree person from a second genealogical tree, and wherein each of the first genealogical tree and the second genealogical tree comprise a plurality of interconnected nodes representing relationships between tree persons;
- generating, utilizing a feature comparator to compare the first set of features and the second set of features:
  - an individual-level similarity vector comprising paired individual-level features from paired tree persons, wherein the paired tree persons include: i) one or more of the first tree person or a first relative related to the first tree person and ii) one or more of the second tree person or a second relative related to the second tree person; and
  - a family-level similarity score from features across familial relationships of the paired tree persons;
- generating, utilizing an individual-level machine learning model to analyze the individual-level similarity vector, an individual-level similarity score defining a similarity between the paired tree persons;
- determining, utilizing a family-level machine learning model based on the individual-level similarity score and the family-level similarity score, that the first tree person and the second tree person are duplicates of a single individual; and
- modifying a cluster database based on determining that the first tree person and the second tree person are duplicates of the single individual.

16. The system of claim 15, wherein at least one of the individual-level machine learning model or the family-level machine learning model is a neural network.

17. The system of claim 15, wherein generating the individual-level similarity vector comprises:
   determining the paired tree persons to include a first individual from the first genealogical tree and a second individual from the second genealogical tree; and
   generating the individual-level similarity vector to include features from the first individual and the second individual.

18. The system of claim 15, wherein generating the family-level similarity score comprises generating a vector based on similarities between familial relationships of the paired tree persons.

19. The system of claim 15, wherein determining that the first tree person and the second tree person are duplicates of the single individual comprises using a feature aggregator to combine the individual-level similarity score and the family-level similarity score.

20. The system of claim 15, wherein generating the individual-level similarity score comprises generating a similarity score based on individual data that does not include relationship data among tree persons.

\* \* \* \* \*